US012038897B2

(12) United States Patent
Beri et al.

(10) Patent No.: US 12,038,897 B2
(45) Date of Patent: Jul. 16, 2024

(54) DOCUMENT CO-EDITING USING A FOREST REPRESENTATION

(71) Applicant: Adobe Inc., San Jose, CA (US)

(72) Inventors: Tarun Beri, Noida (IN); Kush Pandey, Aligarh (IN)

(73) Assignee: Adobe Inc., San Jose, CA (US)

( * ) Notice: Subject to any disclaimer, the term of this patent is extended or adjusted under 35 U.S.C. 154(b) by 161 days.

(21) Appl. No.: 17/742,256

(22) Filed: May 11, 2022

(65) Prior Publication Data

US 2023/0367754 A1 Nov. 16, 2023

(51) Int. Cl.
*G06F 16/22* (2019.01)
*G06F 16/23* (2019.01)

(52) U.S. Cl.
CPC ...... *G06F 16/2246* (2019.01); *G06F 16/2343* (2019.01)

(58) Field of Classification Search
CPC ............... G06F 16/1774; G06F 16/178; G06F 16/2228; G06F 16/2246; G06F 16/23; G06F 16/2343; G06F 16/25; G06F 40/166; G06F 40/197; G06Q 10/101; G06T 11/60
See application file for complete search history.

(56) References Cited

U.S. PATENT DOCUMENTS

| 10,997,770 | B1 * | 5/2021 | Kumawat | G06F 40/109 |
|---|---|---|---|---|
| 2013/0173727 | A1 * | 7/2013 | Libin | H04L 51/10 |
| | | | | 709/206 |
| 2016/0328624 | A1 * | 11/2016 | Angelov | G06F 3/0414 |
| 2018/0052813 | A1 * | 2/2018 | Laupretre | G06F 40/171 |
| 2019/0371008 | A1 * | 12/2019 | Peterson | G06T 9/20 |
| 2021/0312119 | A1 * | 10/2021 | Nelson | G06F 40/134 |

(Continued)

FOREIGN PATENT DOCUMENTS

| CN | 101465973 B | * | 12/2010 | |
|---|---|---|---|---|
| GB | 2504653 A | * | 2/2014 | G06T 9/20 |

OTHER PUBLICATIONS

Fraser, Neil, "Differential Synchronization," Proceedings of the 9th ACM symposium on Document engineering (DocEng '09). Association for Computing Machinery, New York, NY, USA, Sep. 2009, pp. 13-20.

(Continued)

*Primary Examiner* — James E Richardson
(74) *Attorney, Agent, or Firm* — Nicholson De Vos Webster & Elliott LLP

(57) ABSTRACT

Embodiments are disclosed for managing co-editing management. A method of co-editing management includes detecting a modification operation to be performed on a sequential data structure being edited by one or more client devices, determining a segment of the sequential data structure associated with the modification operation based on a logical index associated with the modification operation, generating a tree structure associated with the segment, a root node of the tree structure corresponding to the modification operation, determining a global index for the root node of the tree structure, and sending an update corresponding to the modification operation, including the root node and the global index, to a co-editing server to be distributed to the one or more client devices.

20 Claims, 14 Drawing Sheets

(56) References Cited

U.S. PATENT DOCUMENTS

2022/0005285 A1* 1/2022 Batra .................. G06T 11/203

OTHER PUBLICATIONS

Greenspan, David, "Implementing Fractional Indexing," Mar. 9, 2020, retrieved from Internet: https://observablehq.com/@dgreensp/implementing-fractional-indexing.

Letia et al., "CRDTs: Consistency without concurrency control," INRIA Rocquencourt, Jun. 2009, 17 pages.

Nelson, Joe, "User-defined Order in SQL," begriffs.com, Mar. 20, 2018, retrieved from Internet: https://begriffs.com/posts/2018-03-20-user-defined-order.html.

Preguica, et al., "Conflict-Free Replicated Data Types: An Overview," 2018, 20 pages.

Roh et al., "Replicated abstract data types: Building blocks for collaborative applications," Journal of Parallel and Distributed Computing, 71(3), 2011, pp. 354-368.

Sun et al., "Operational Transformation for Collaborative Word Processing," Proceedings of the 2004 ACM Conference on Computer Supported Cooperative Work (CSCW '04), Association for Computing Machinery, Nov. 2004, pp. 437-446.

Wallace, Evan, "Realtime Editing of Ordered Sequences," Mar. 6, 2017, retrieved from Internet: https://www.figma.com/blog/realtime-editing-of-ordered-sequences/.

Weiss et al., "Logoot: A Scalable Optimistic Replication Algorithm for Collaborative Editing on P2P Networks," 29th IEEE International Conference on Distributed Computing Systems—ICDCS 2009, Jun. 2009, pp. 404-412.

Wolfram Mathworld, "Stern-Brocot Tree," retrieved from Internet: http://mathworld.wolfram.com/Stern-BrocotTree.html on May 20, 2022.

\* cited by examiner

| Number of anchors in Bezier Path | Full Path Data Size (in bytes) | Our Solution (in bytes) |
| --- | --- | --- |
| 50 | 3455 | 255 |
| 100 | 6755 | 255 |
| 500 | 33155 | 255 |
| 1000 | 66155 | 255 |
| 5000 | 330155 | 255 |
| 10000 | 660155 | 255 |

*FIG. 10*

DOCUMENT CO-EDITING USING A FOREST REPRESENTATION

BACKGROUND

As more workplaces adopt more work-from-home and hybrid working arrangements, work that was previously performed collaboratively by teams in person has to be performed remotely. Concurrent editing enables multiple users to edit the same document at the same time. Additionally, the rise of web or cloud-based applications has made co-editing possible for an increasing number of document types. For example, concurrent editing systems have been implemented for a wide variety of applications, such as word processing applications, spreadsheet applications, presentation applications, code editors, etc.

SUMMARY

Introduced here are techniques/technologies that provide an improved document co-editing system. Embodiments use a Stern-Brocot Forest representation to track and propagate changes made by different editors. When multiple users are making changes to a document simultaneously, the system needs to ensure that each party can accurately apply changes received from other users. This requires that the users start from the same state and that as any one user changes the state of the document that the changes are accurately propagated to the other co-editing parties.

In some embodiments, the Stern-Brocot Forest representation is a two-tiered data structure that includes a logical tier and a physical tier. The logical tier represents the initial state of a sequential array, such as a Bezier path. In such instances, the logical tier includes an implicit index for each anchor point on the Bezier path. The physical tier represents changes made to the sequential array. For example, as elements are added, deleted, reordered, etc., new nodes are added to a Stern-Brocot tree. The Stern-Brocot forest may include multiple Stern-Brocot trees each representing changes made to a different segment of the sequential array. Individual changes to the sequential array can be propagated from one client to another via a co-editing server using the globally unique Stern-Brocot Forest representation, which is translated by each client into its own local representation. This ensures that changes remain consistent at each client no matter what changes a client has made prior to receipt of changes from another client.

Additional features and advantages of exemplary embodiments of the present disclosure will be set forth in the description which follows, and in part will be obvious from the description, or may be learned by the practice of such exemplary embodiments.

BRIEF DESCRIPTION OF THE DRAWINGS

The detailed description is described with reference to the accompanying drawings in which:

FIG. 10 illustrates an example of comparative performance of techniques for managing Bezier paths in a co-edited document;

DETAILED DESCRIPTION

Figure 1:
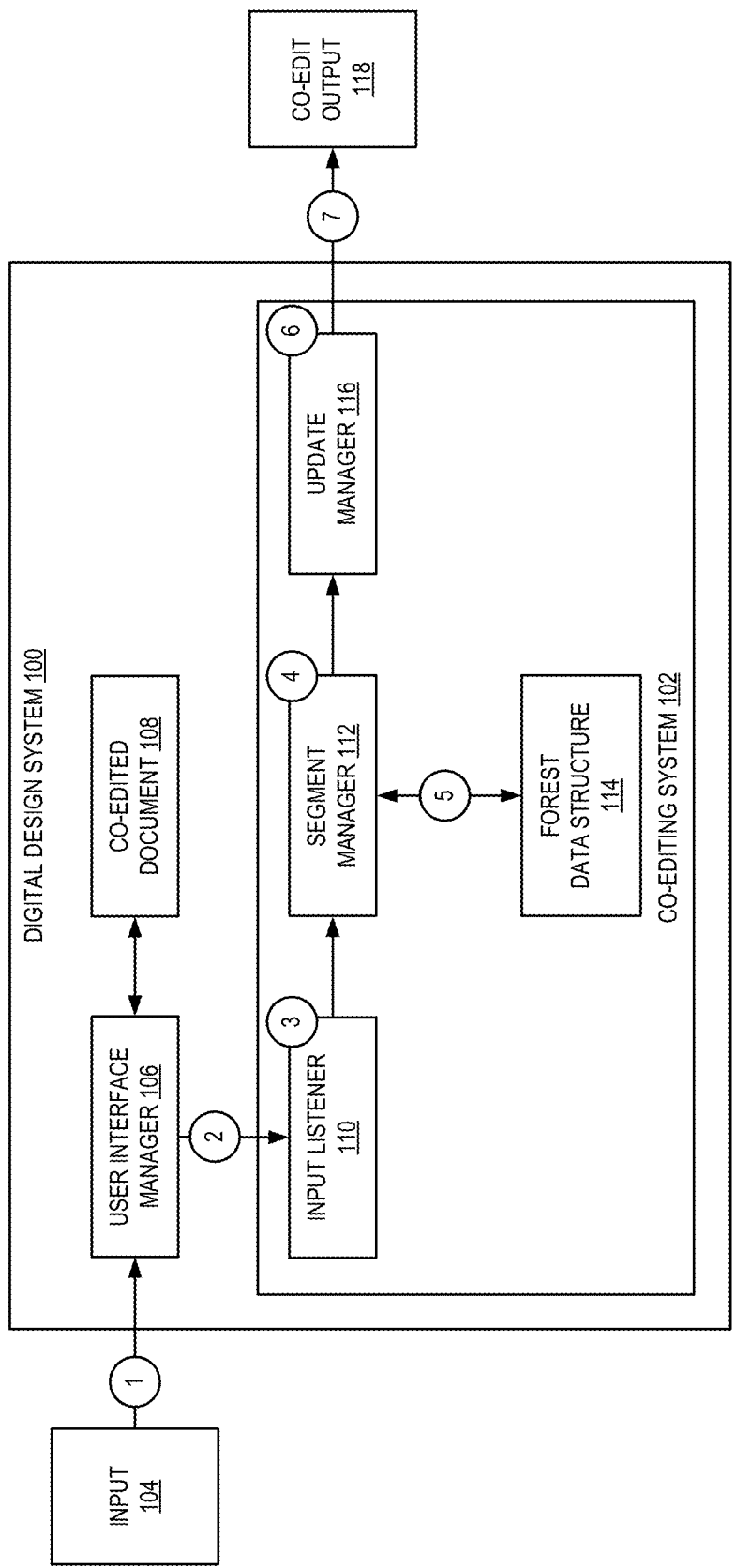
FIG. 1 illustrates a diagram of a process of co-editing management in accordance with one or more embodiments.

One or more embodiments of the present disclosure include a concurrent editing system that can efficiently manage complex files, such as vector graphics. Embodiments use an improved fractional indexing system which allows for changes to objects to be efficiently synchronized globally across all client devices. In particular, embodiments enable Bezier path co-editing at the anchor point-level with insignificant storage and data transfer costs. In some embodiments, a forest of tree data structures, such as modified Stern-Brocot trees, are used to represent changes to the anchor points of a Bezier path. Because Bezier paths are a sequential structure (e.g., they have a starting point and ending point), the initial state of a path is represented logically, requiring no additional data footprint. As such, the forest representation remains sparse and most fractional indices can be determined implicitly (e.g., without explicitly computing and storing them on all co-editing parties). Individual trees and explicit fractional indices are created when an operation (e.g., add, delete, reorder, etc.) changes the relative ordering of anchors. When such an operation occurs, only a few indices need to be created while the rest remain implicitly determinable. Although embodiments are generally described with respect to Bezier paths, similar techniques may be used for co-editing any sequential structure.

For example, the initial state of a vector graphic includes one or more paths, each of which includes one or more anchor points. For simplicity of explanation, assume that a co-edited drawing includes a single Bezier path including a plurality of anchor points. The anchor points are implicitly indexed from the start of the Bezier path to the end of the Bezier path, and this state is known by each client device that accesses the drawing without computing and/or storing additional index data. As such, these initial anchor points serve as the logical indices of the forest data structure that represents this Bezier path. As the co-editing users make changes to the drawing (e.g., add new anchor points, remove existing anchor points, reorder existing anchor points, etc.) these changes are represented by a tree data structure, and the implicit indices of nearby anchor points are used to determine the index of the root node of this tree. This provides an efficient global index for each Bezier path that ensures that the changes represented by any given tree are accurately applied by each co-editing client. Further, periodic atomic reset capability allows all co-editing parties to adopt a global implicit state (i.e., zero memory consumption) at suitable intervals.

Traditionally, concurrent editing systems are typically implemented in one of two ways. One implementation employs a global locking system and locks out all but one co-editing party from modifying an object. Another implementation employs a lock-less system and freely allows updates from all co-editing parties. Such systems rely on user behavior to avoid conflicts. For example, typically users tend to avoid interfering with other people's edits as a courtesy and, in the event of a conflict, a suitable conflict resolution protocol is used to achieve eventual global consistency. While locking avoids conflicts and conflict resolution, it introduces other challenges including overhead and complexity of distributed locks, temporary network outages leading to inconsistent lock states, failure to acquire a lock requires forcible rollback of client operations, undo-redo also being dependent on locks occasionally fails, etc. These challenges have pushed the industry and academia towards lock-free systems.

Current co-editing methods work with an entire path as a single unit and any change to one anchor is considered a change to the entire path. This requires data for all anchors to be transferred across the network to all co-editing parties for every update. This results in both changed and unchanged anchor point data being transferred for every update. Such techniques are workable for a small number of anchors, but when the complexity of the drawings increases, this places a significant load on the underlying computing resources (e.g., the network, the co-editing servers (serializing and forwarding these updates), and the client machines sending and receiving this data). Current solutions like fractional indexing can help by uniquely identifying anchors across multiple co-editing parties, and thus allow anchor level updates, rather than path level updates. However, these techniques need a fractional index to be assigned (on all co-editing parties) and stored for every anchor of every path. A typical document can include several thousand Bezier paths and tens of thousands to millions of anchor points. With thousands of paths and hundreds (or thousands) of anchors per path, generation and storage of these fractional indices becomes prohibitive. In particular, this leads to slower document open times and increased overall memory consumption.

In addition to the performance costs of indexing, past fractional indexing solutions also suffer from precision issues. Databases have long allowed user defined orders over sequential table rows. While this order can be used to quickly retrieve information (by locating desired rows faster), it is also critical to allow multiple users concurrently update the same table. For simultaneous updates, one not only needs the ability to dynamically insert or remove rows from multiple sites, but also a larger sanity and consistency guarantee. The core issue is that every user has its own local view of the table, and it might not match the local view of others, or the current global view. For example, a user inserting a new row at index 3 would land into an issue if by the time its change is committed, another user inserted a row at index 2. Thus, a mechanism is needed where the existing indices remain stable and new ones can be inserted in between.

One solution for this is to leave gaps between existing integral indices, and these gaps serve as room for future insertions. But integers have limited capacity and they run out of indices quickly. Also, leaving even gaps between every pair of rows is prone to fragmentation and load imbalance. An alternative solution is to use fractions instead of integers. A new row between index 2 and 3 will be inserted at index 2.5. This guarantees that the existing indices are left undisturbed and multiple users can simultaneously add new rows. However, every new fractional index involves finding the midpoint between adjacent indices and thus consumes one more significant digit. This leads to fractional indices running of out precision fairly quickly (e.g., 38 insertions for an 8-byte double precision number). To address this, some solutions have resorted to representing fractional indices with strings (rather than floating point numbers). However, string representation requires more storage, more network bandwidth to transport (especially when fractional indices become large after a few hundred insertions) and are also more expensive to compare than mere numbers.

Another drawback of fractional indexing is that every element (e.g., database table row, graphic tree child, etc.) must know its initial fractional index (on all co-editing sites) before it can allow further insertion (or removal) of elements. This means that when a graphic document is opened, all entities that need to be a future participant to a fractional index-based update must generate (or deserialize) their initial fractional index. Note that generation of this as well as storage (especially string representation) would consume significant processing power and space if the number of elements is large. For graphics processing applications, processing a Bezier path with a high number of anchors incurs several challenges with fractional indexing. First, updates to Bezier paths are more frequent than adding (or removing) elements from the graphic tree. Second, the count of Bezier paths can be much higher in some applications, which leads to significant initial fractional index generation time as well as high resource costs for storing, communicating, and comparing long string-represented fractional index-based updates.

Thus, most existing graphic design applications do not concurrently edit Bezier paths at the anchor level. Rather, the entire path is edited as a single indivisible component. As described earlier, this has the potential to saturate network stacks, application processing pipelines, and operation storage databases. Embodiments address the failures of conventional systems by enabling the initial state of a Bezier path (or other sequential array) to be indexed implicitly. This means there are no startup delays to explicitly index each anchor point when the document is opened. Additionally, there is no memory footprint required, as the initial indices can all be determined implicitly. Only when changes are made is memory consumed, and then only to represent specific changes, such as adding a new anchor point, deleting an existing anchor point, reordering anchor points, etc. Additionally, the use of Stern-Brocot trees provides an efficient way to represent global indices for these changes. This reduces the network cost of propagating changes to multiple co-editing parties.

FIG. 1 illustrates a diagram of a process of co-editing management in accordance with one or more embodiments. As shown in FIG. 1, digital design system 100 includes a co-editing management system 102. The digital design system 100 can be implemented as an image processing application, digital visual effect application, desktop publishing application, vector graphics editor, user interface design application, or other digital design application which enables concurrent co-editing of documents. The co-editing management system 102 manages changes made by the user and the co-editors to ensure that the changes by one user are consistently applied to the document being edited by other users. Likewise, changes received from other co-editors are first processed by the co-editing management system to ensure they are accurately applied to the co-edited document.

As shown in FIG. 1, a user provides an input 104 to the digital design system 100, at numeral 1. The input varies depending on the type of digital design system 100 and the document being co-edited. For example, where the digital design system 100 is a vector graphics application, the input 104 may include creating, editing, or deleting Bezier paths, which may include adding, deleting, or rearranging anchor points of the Bezier paths. Embodiments are generally described in the context of a vector graphics application and the editing of Bezier paths; however, embodiments are also applicable to other use cases in which a sequential data structure is being manipulated.

The input 104 is received by a user interface manager 106 which then applies changes to the co-edited document 108 based on the input 104. At the same time, the user interface manager 106 sends a message to co-editing management system 102, at numeral 2, notifying the co-editing management system of the received change. The notification is received by an input listener 110. At numeral 3, the input listener 110 determines whether the input is relevant for co-editing purposes. For example, the input may include changing the magnification of the view of the co-edited document 108 or other inputs that do not modify any objects, such as Bezier paths, of the co-edited document. Such inputs can be ignored. However, if the input 104 results in a change to an object of the co-edited document, then details of the change are forwarded to segment manager 112.

At numeral 4, segment manager 112 determines which elements are associated with the change. For example, in a vector graphics application, the change may include adding, deleting, or reordering anchor points of a Bezier path. Each anchor point of the initial state of the Bezier path corresponds to an element. If one of the existing anchor points is modified, then the segment manager determines a global index for that element and provides the global index to the update manager 116 to generate an update for the other co-editing parties. If a new anchor point is added between existing anchor points, then a representation of that change needs to be generated which references the adjacent anchor points. In some embodiments, the representation takes the form of a Stern-Brocot tree. Stern-Brocot trees are a type of binary tree that maintain an index per node. In some embodiments, the Stern-Brocot tree maintains separate integral numerators and denominators per node. Alternatively, the Stern-Brocot tree maintains other representations of the index. For example, it may store the index as a matrix or array (e.g., storing multiple numerators and denominators), or it may store the index directly as a fraction or numerical value. The representation used may vary depending on the use case. The index of a new node inserted between any two given nodes is determined by adding the numerators from the two given nodes (e.g., the new node's ancestor nodes) to yield the numerator of the new node and adding the denominators from the ancestor nodes to yield the denominator of the new node. This provides an efficient way of representing a fractional index of a new node. Stern-Brocot trees are discussed in more detail below.

At numeral 5, the segment manager 112 determines whether the forest data structure 114 includes a node associated with the change. As discussed further below, the state of the co-edited document 108 is represented using a two-tiered data structure. The initial state of the document is represented by a logical tier and changes to that initial state are represented by a physical tier. For example, indices for the initial anchor points of a Bezier path do not need to be computed and stored. This follows from the sequential nature of a Bezier path from a first anchor point to a last anchor point. The indices of the anchor points are implicit, and each co-editing client device can determine how to apply changes associated with these anchor points. However, if one editor adds an anchor point and another editor deletes an anchor point, each editor's local drawing has changed. When the other editor's changes are received, they may be misapplied, as the local indices may no longer align. As such, new nodes of the forest data structure are physically created to represent these changes. If the change necessitates a new node to be created, one is created using fractional indexing, such as by creating a new Stern-Brocot tree or adding to an existing Stern-Brocot tree.

At numeral 6, update manager 116 generates an update to be sent to all co-editing parties. The update is associated with the node that corresponds to the change. For example, a change that modifies an anchor point of the initial state includes the implicit index of that anchor point. A change associated with a node from the physical tier of the forest data structure includes a global index of the node determined from the forest data structure. At numeral 7, the global index and the change properties are then sent as co-editing output 118. For example, the co-editing output 118 can be sent to a co-editing server which then distributes the change to all co-editors.

Figure 2:
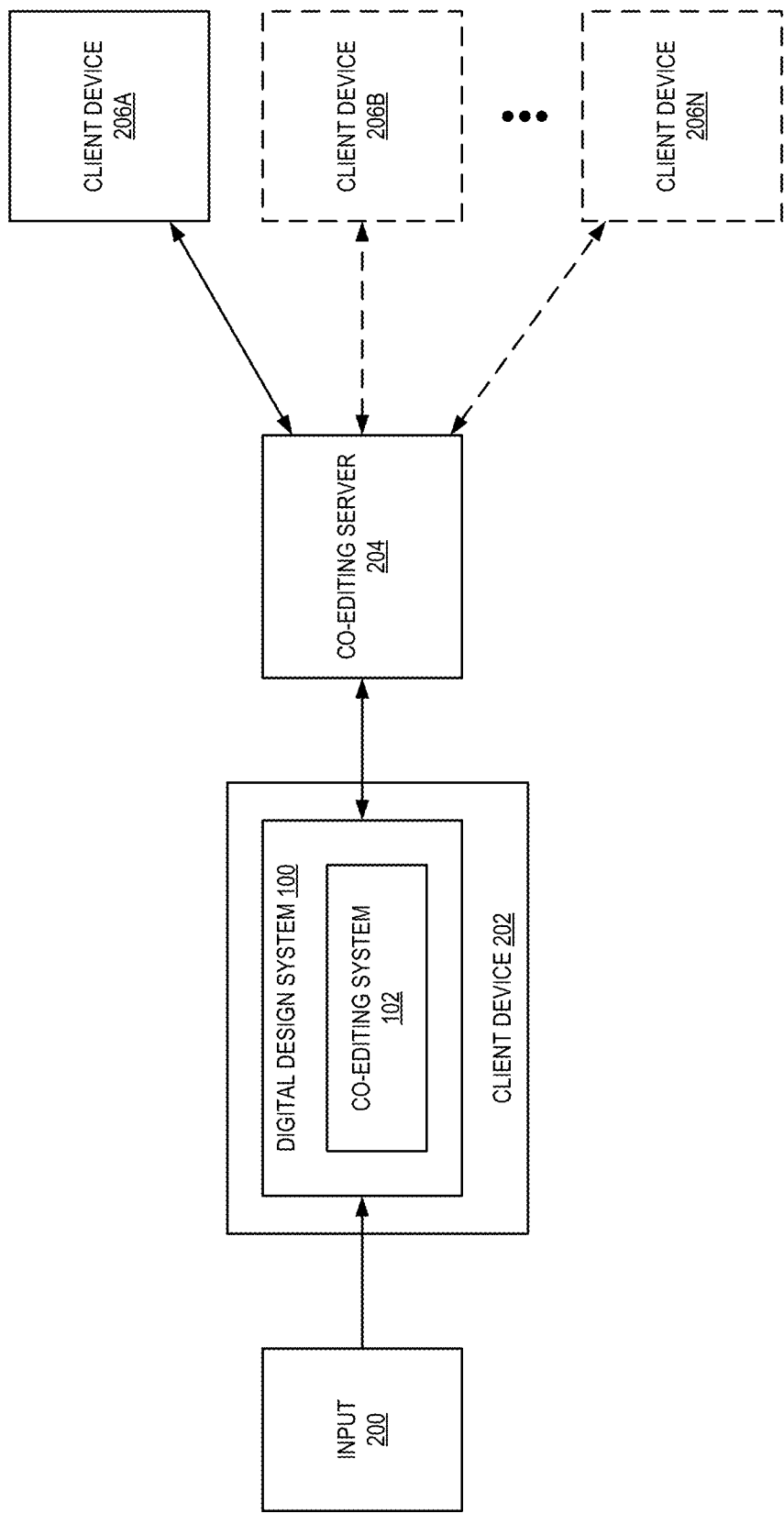
FIG. 2 illustrates a diagram of an environment for co-editing images in accordance with one or more embodiments.

FIG. 2 illustrates a diagram of an environment for co-editing documents in accordance with one or more embodiments. As shown in FIG. 2, an input 200 is received by digital design system 100. In the example of FIG. 2, digital design system 100 is implemented on a client device 202. The client device 202 is used by one co-editor to manipulate a co-edited document. As discussed, the input may include one or more changes to be made to a co-edited document.

Co-editing management system 102 then generates an appropriate update that reflects the changes and includes a global index that is usable by all co-editing parties to accurately apply the changes to their own copies of the co-edited document. This change is sent by the digital design system 100 to co-editing server 204. Co-editing server 204 may include a server associated with the digital design system 100. For example, the digital design system may use a co-editing service provided by, e.g., the developer of the digital design system 100. Additionally, or alternatively, the co-editing server 204 may be provided by a third-party developer who provides a co-editing service that is compatible with the digital design system 100. In such instances, the co-editing server 204 may be provided using computer resources provided by the developer, third-party developer, or other entity, such as a cloud services provider. In some embodiments, the co-editing server may be maintained by an end user or organization (e.g., as an on-premises network) which enables the organization's employees, customers, etc. to access and collaborate on document generation. Alternatively, in some embodiments, co-editing may be performed in a server-less peer-to-peer environment. Because there is no server to provide a global order to the updates from multiple clients, in a peer-to-peer system one can use one of the several kinds of global clocks (vector clocks, Lamport timestamps, matrix clocks, version vector, etc.) to establish a unique order of operations.

In each case, the update from one client is received by the co-editing server 204 and distributed to all co-editors, e.g., client devices 206A-206N. Each client device 206A-206N includes its own digital design system, local copy of the document being co-edited and local copy of Stern-Brocot Forest for every sequential array being co-edited. The changes are applied locally, using the global index, which ensures that each copy is updated consistently. In some embodiments, co-editing server 204 maintains its own copy of the document being co-edited. This may be a primary copy of the document and the local copies maintained by each client device may be secondary copies.

In some embodiments, co-editing server is responsible for initiating periodic atomic resets of the document state. For example, the co-editing server 204 obtains a lock on the document and instructs each client device to update its forest data structure to reflect the new state. As discussed further below, this allows the physical tier to be cleared, as the new initial state of the document is represented in the logical tier. Subsequent changes then result in new physical indices being determined and added to the physical tier. Atomic resets may be performed after a specific amount of time has passed, when an editor opens or closes the document, based on a size of the data structure, upon request by one or more of the clients, or other conditions.

In some embodiments, co-editing server 204 is also responsible for conflict resolution. A conflict arises when two independent co-editing parties with the same current local view insert an element at the same local sequential index. In this case, both parties compute the same global index for their insertion and send their operation to the co-editing server. The server determines an order of execution (often in the order of arrival of operations at the server) for these operations and broadcasts them in that order. This establishes a consistent global order of execution of operations on all co-editing parties, which now must adhere (by making local changes sometimes) to achieve an eventually consistent state everywhere. Among the parties where these operations originated, one of them sees its local operation consistent with the first operation in the global ordering established by the server. The other party, however, receives a different first operation and hence concludes a conflict. Thus, it must adapt by assigning the global index to the server's chosen operation. For the operation chosen by the server to execute second, both parties (and all others in the system) already have the desired global index already consumed on their end. Thus, they make the element insertion in a predefined manner (e.g., either to the left or to the right of the conflicting insertion made by the first operation) to obtain a new global index (consistent on all co-editing parties) and resolve the conflict. Conflicts associated with other operations, such as element deletion or reordering may be handled similarly. Alternatively, different methods of conflict resolution may be employed as are known in the art.

Figure 3:
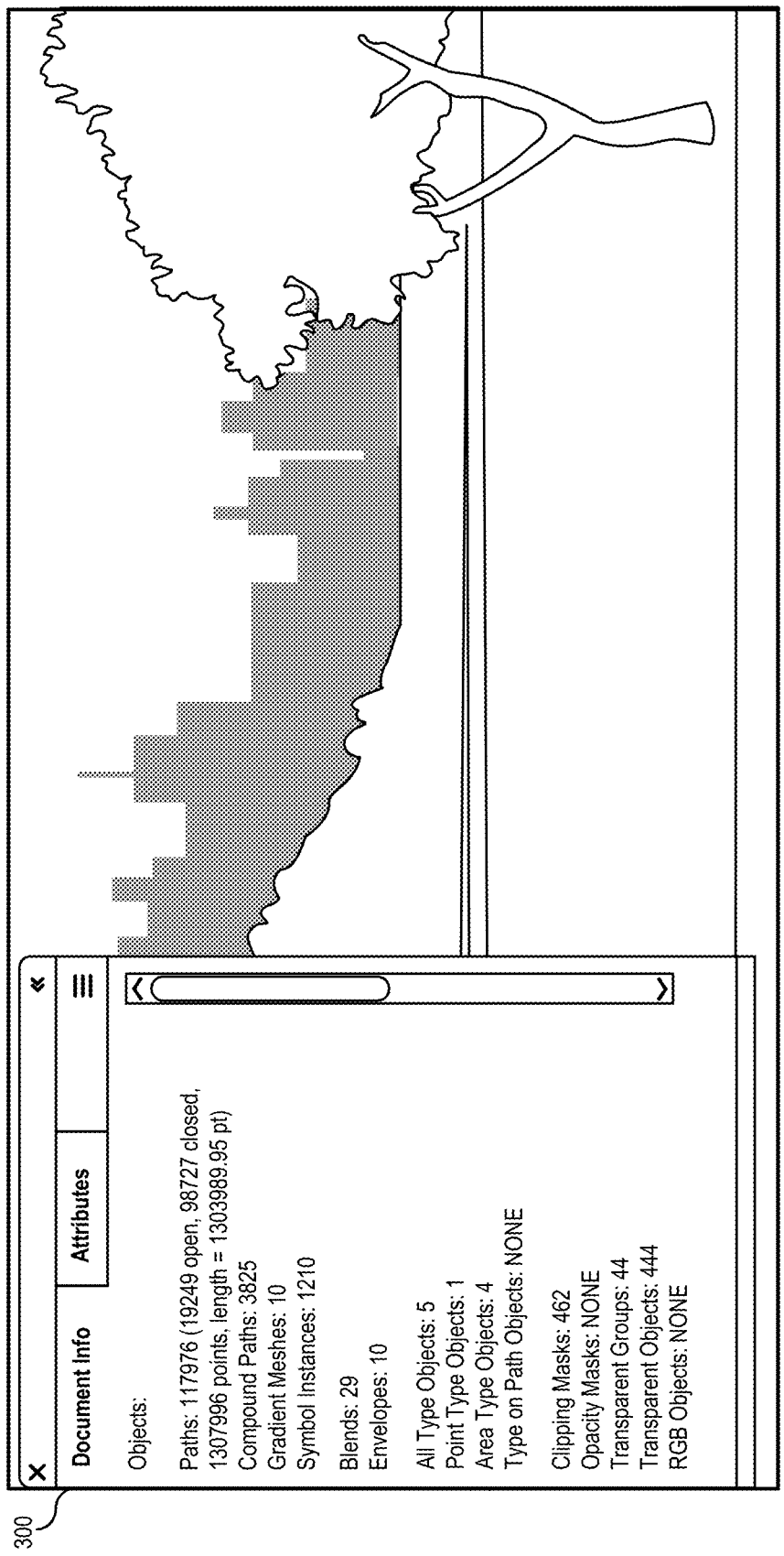
FIG. 3 illustrates an example image.

FIG. 3 illustrates an example image. As discussed, large and/or complex documents present a challenge for traditional fractional indexing systems. For example, in the vector graphic image of FIG. 3, there are 117,976 Bezier paths which include 1,307,996 anchor points. A graphic of this complexity is resource prohibitive when a full path update is required when a change to any one anchor on that path is made. This adds additional network load as data for every anchor point of that path must be propagated, even those that have not changed. For example, as shown in the table below, the size of a path increases rapidly as the number of anchors in the path increase.

| Number of anchors in Bezier path | Full path data size in bytes |
|---|---|
| 50 | 3455 |
| 100 | 6755 |
| 500 | 33155 |
| 1000 | 66155 |
| 5000 | 330155 |
| 10000 | 660155 |

Additionally, to use traditional fractional indexing techniques, every anchor point would require an index to be computed. This leads to a significant load time for large and complex drawings, such as the one shown in FIG. 3.

Figure 4:
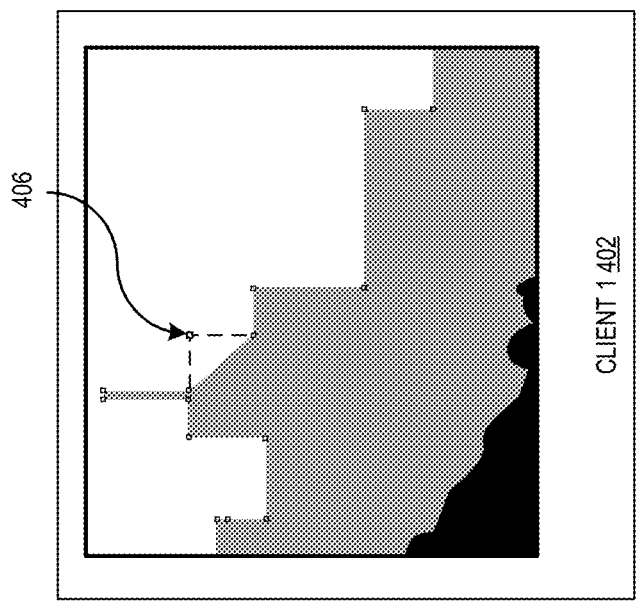
FIGS. 4-5 illustrate an example of changes made to a co-edited drawing.
Figure 4:
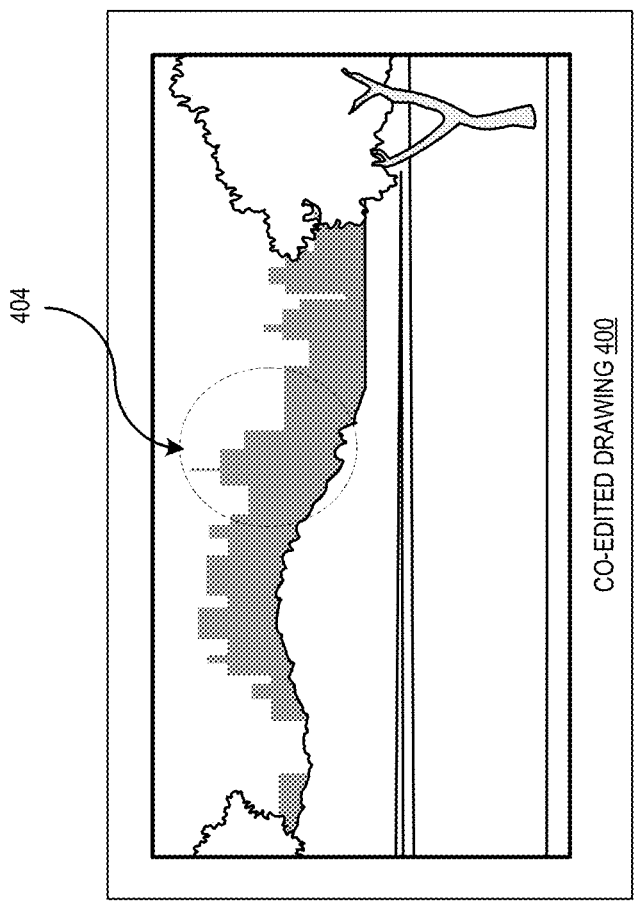
Figure 5:
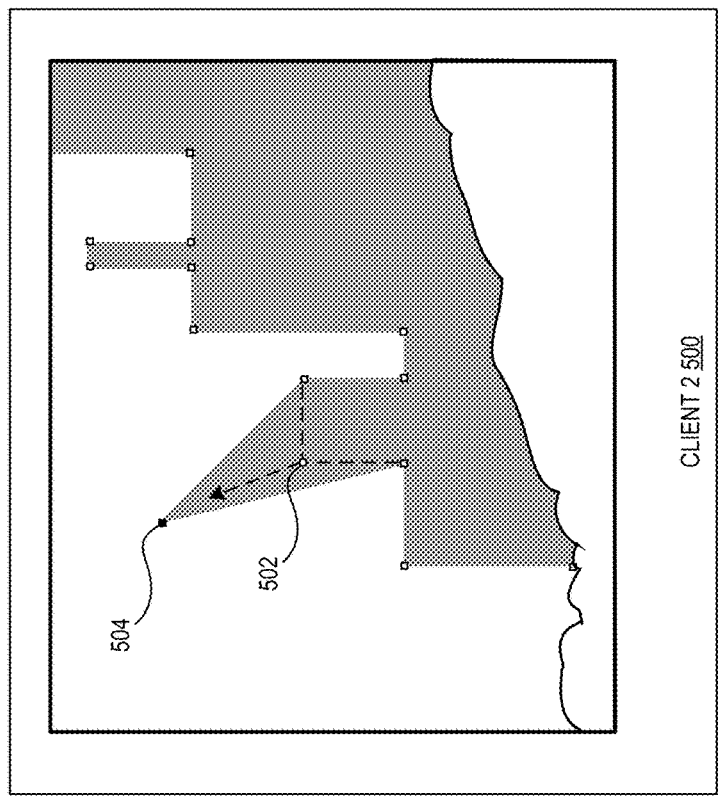
Figure 5:
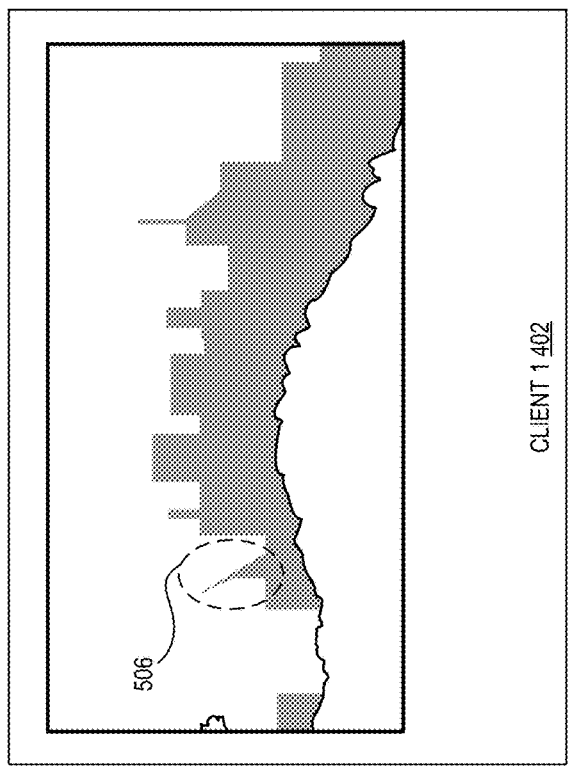

FIGS. 4-5 illustrate an example of changes made to a co-edited drawing. As shown in FIG. 4, co-edited drawing 400 can be simultaneously edited by multiple parties. Although the drawings start synchronized among multiple users, once a user makes a change to their copy of the drawing it is difficult to guarantee that the drawings stay synchronized. For example, if a user adds or removes an index, then all of their succeeding element indices have changed. Each co-editor needs to be notified of these changes. For example, client 1 402 (e.g., a client device in use by a first user to edit co-edited drawing 400), is viewing and editing a region 404 of co-edited drawing 400. This may include removing an anchor point 406 (e.g., deleting an index), which causes that region of the drawing to be updated as shown. In this example, the co-edited drawing includes a city skyline, and in removing an anchor point the shape of one of the buildings have been changed.

Before the changes made by the first user are propagated to other edits, a second user using client 2 500 edits a different portion of the co-editing drawing, as shown in FIG. 5. In this instance, the second user changes the position of an anchor point 502 from a first position to a second position 504. This results in the shown changes to that portion of the skyline. These changes have to be reconciled across clients. However, because the first user deleted an anchor point, their local index of anchor points may have changed. This can lead to unintended results when changes are made by another client using the old indices. For example, as shown at 506, the wrong anchor point has been modified in the version of the co-edited drawing shown on client 1 402, making the drawings inconsistent across clients.

As discussed, prior techniques have used element gaps or fractional indexing to address such consistency issues. However, leaving gaps limits the number of changes that can be made. This is particularly a problem in high index applications, such as vector graphics, where there are often a very large number of anchor points (e.g., indexes), and also leads to fragmentation. Conventional fractional indexing also quickly exhausts available resources, as a new significant digit is required for each new fraction. Alternatively, fractional indexing can be performed using other number bases than decimal, such as hexadecimal or larger. However, larger bases are not readily expressed using floating point numbers. This leads to the use of strings to represent the fractions, which is more computationally expensive than floating point numbers. Additionally, in conventional fractional indexing systems, each anchor point must be assigned an initial index. For large drawings, this leads to a significant start up lag.

Figure 6:
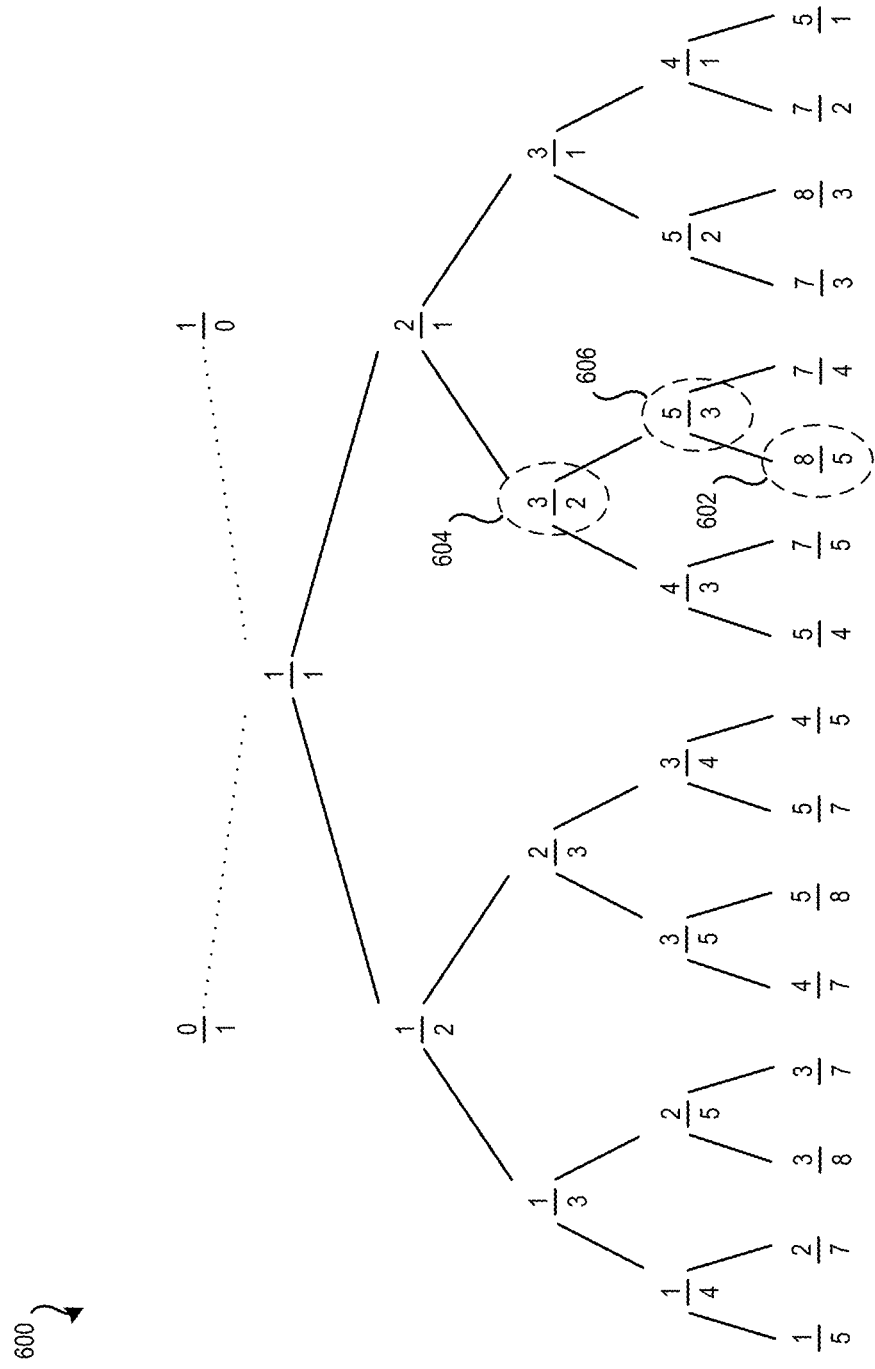
FIG. 6 illustrates an example of changes made to a co-edited drawing in accordance with one or more embodiments.

FIG. 6 illustrates an example of a Stern-Brocot tree. Embodiments use Stern-Brocot trees to represent fractional indexes. This allows for both no index initialization for sequentially indexed arrays, such as Bezier paths, and new indices are simple to represent using floating point numbers. Fractional indexing bisects indices of a previous element and a next element to insert a new element in-between. This causes a quick consumption of precision (as every new insertion increases significant digits by 1). A Stern-Brocot tree is a binary tree that maintains separate integral numerators and denominators per node (and not their division result). Insertion of a new node in-between any two given nodes requires the addition of the numerators (from the two ancestor elements) to yield numerator of the new element, and addition of the denominators (from the two ancestor elements) to yield denominator of the new element. The final fractional index of an element is obtained by dividing its numerator by its denominator.

An example Stern-Brocot tree 600 is shown in FIG. 6. However, just using a Stern-Brocot tree alone can address the precision issues of traditional fractional indexing but introduces its own issues. For example, each element must maintain its own fractional index. Additionally, although one node is the new node's immediate parent, the other node requires walking the tree to identify, which incurs performance costs. As shown in FIG. 6, if a new element 602 is added, then to determine the numerator and denominator of the new element, the new element needs access to the Stern-Brocot element just to the left of it 604 and just to the right of it 606. Element 606 is the immediate parent of the new element 602, but additional traversal of the tree is required to identify element 604. To address both the shortcomings of conventional fractional indexing and the use of Stern-Brocot trees, embodiments use a Stern-Brocot forest, as described below.

Figure 7:
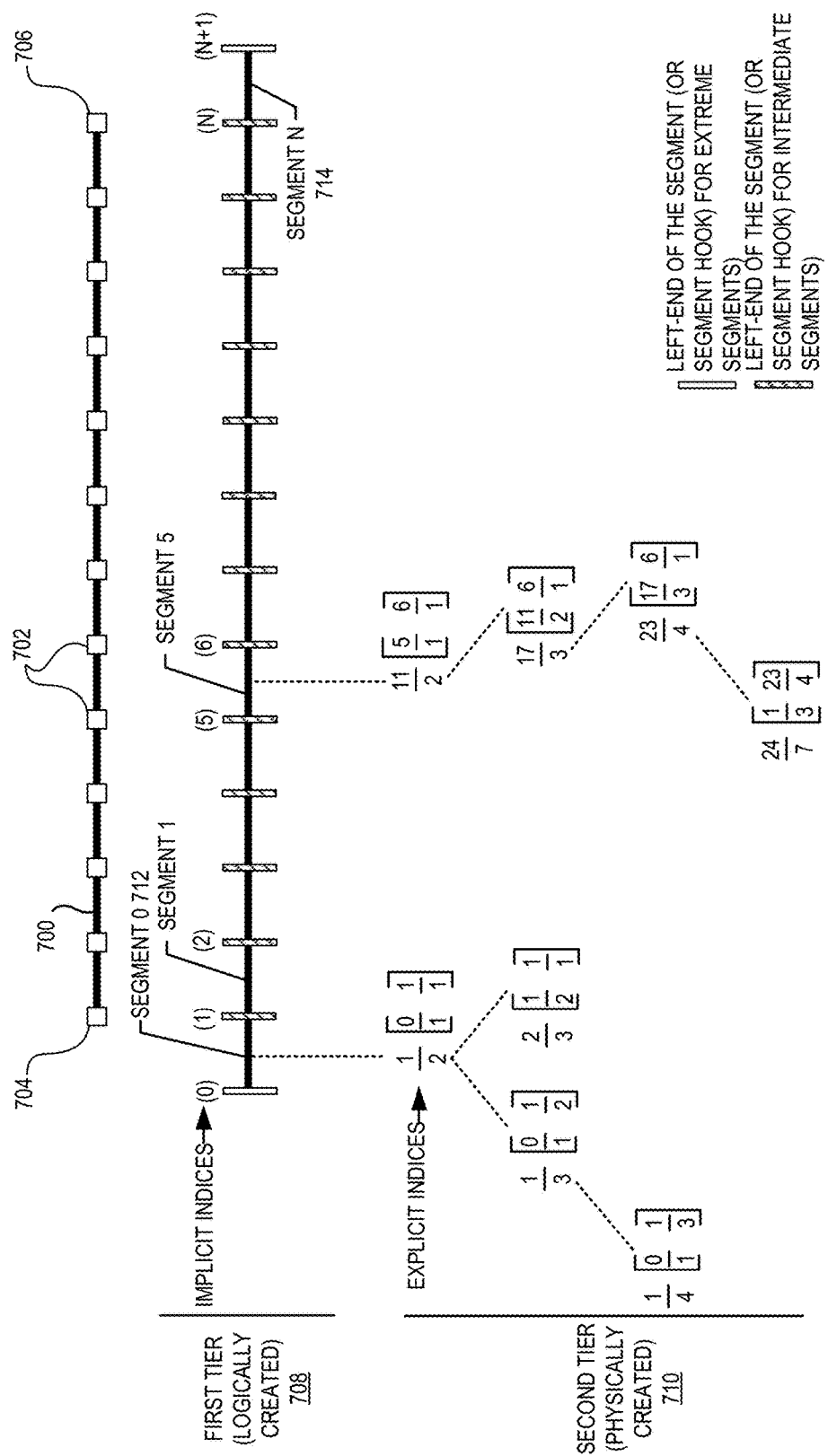
FIG. 7 illustrates an example of a Stern-Brocot forest.

FIG. 7 illustrates an example of a Stern-Brocot forest, in accordance with one or more embodiments. Embodiments provide a two-tiered Stern-Brocot forest to represent Bezier paths at the anchor point level. Although embodiments are discussed with respect to Bezier paths, embodiments are similarly applicable to any structure that can be represented as a sequential array of indices. At startup, a Bezier path 700 includes a plurality of anchor points, such as anchor points 702. Implicitly the anchor points of Bezier path 700 start at anchor point 1 704 and end at anchor point N 706. Knowing this initial state, a first tier 708 is logically created which starts at index 0 and ends at index N+1. By adding an implicit index before and after the first and last anchor points, any new anchor points added before or after the initial state of the Bezier path can be represented using Stern-Brocot trees. Because this tier is logical, it provides a low overhead solution. There is no need to explicitly assign an index to each element as each initial index is implicitly generated.

The first tier 708 remains active from document open time, until an operation on a Bezier path causes relative ordering of its anchors to change. These operations are limited and include anchor add, anchor delete, and anchor reorder. All other operations like accessing an anchor to change its location or modify its features (e.g., change its roundness, etc.) do not cause a relative order change (of anchors), and thus the system remains in first tier for that particular Bezier path. Once a relative anchor order change operation happens, the path moves to a second tier 710 that is physically created in memory.

As shown, the physical tier includes the newly inserted or deleted anchors which are explicitly maintained in Stern-Brocot trees, while fractional indices for rest of the anchors in the path remain implicitly available (i.e., without any explicit memory consumption). Periodically, a reset can be carried out atomically across all connected co-editing parties where the state of all or some of the Bezier paths in the document are reset. This moves all of the current anchor points in those Bezier paths to the first tier, allowing for the physical tier to be cleared, freeing up the memory that it previously consumed. All Bezier paths in the document operate independently of one another, and at any given time some paths can be in first tier 708 while others are using their second tier 710.

A path with N initial anchors (e.g., at document open) has fixed initial fractional indices. An example is anchor index 1 for the first anchor, anchor index 2 for the second, anchor index 3 for the third, and so on. Since these are determinable with a simple fixed mathematical formula, there is no need to explicitly store them. If a path update needs fractional index for one of these initial anchors, it can be directly determined with this formula and returned. In the first tier 708, fractional indices of all anchors work with this simple mechanism. As such, no system resources are needed to explicitly store the indices, nor are there any added costs of string representation, communication, and comparison as with conventional fractional indices discussed above.

As shown in FIG. 7, between any given pair of indices is a segment which refers to the possible range of fractional indices that may exist between that pair of indices (e.g., anchor points). Thus, for N initial anchor points, there are n−1 segments in between. In addition, two additional segments—one before the first anchor and one after the last anchor. In the example of FIG. 7, these are shown as Segment 0 712 and Segment N 714. These additional segments are required to handle anchor insertions (and deletions) at the start and end of the path. When a new anchor is inserted or an anchor is deleted, a new Stern-Brocot tree is created to represent changes in that segment (if one does not exist). This means that if five new anchors are created in five different segments, five new Stern-Brocot trees (each with one node) are created. On the other hand, if all five anchors are inserted in the same segment, only one Stern-Brocot tree (with five nodes) is created. Thus, the overall memory consumption of the forest remains linear to the number of relative anchor ordering change operations. Handling anchor deletions are easier than insertions. If an implicit anchor (e.g., one that existed at first tier) gets deleted it is marked so with an explicit flag. If an anchor represented by a node (e.g., inside a Stern-Brocot tree) gets deleted, it is explicitly removed from the tree. Alternatively, a flag can be set for tier two nodes similar to tier one nodes to indicate deletion. This consumes additional memory that could otherwise be freed but ensures that changes are not mistakenly applied to the wrong node due to improper indexing.

Any change to a path being concurrently edited is communicated to other clients (e.g., via a co-editing server) using the fractional index obtained from the forest of Stern-Brocot trees. This can be viewed as every client having its own local representation of a path, which does not necessarily currently match the local representation of another remote client. But the forest-generated fractional index is globally unique and consistent for every anchor. Before sending a local anchor update, a client obtains its global fractional index and uses that global fractional index to send updates to the other clients. Upon reception, the receiving client uses its own forest to convert the received global index to its local one. For example, assume a path has ten initial anchors, and client A inserts a new anchor at index 4 and client B concurrently inserting a new anchor at index 3.

Client A would get a global fractional index of 3.x while client B would get a global fractional index of 2.x (e.g., where x>0). When the operations reach the other client, they can locate the insertion points by converting the global fractional index to their local fractional index and add remote anchors at corresponding local indices 3 (for client A) and 5 (for client B). If both clients happen to insert their anchors in the same segment, the tie can be broken using conventional conflict resolution techniques.

Once a second tier has been created for a path, it remains in that state until an atomic reset is performed across clients. An application might choose to maintain the second tier for the path, or it can perform an atomic reset. The atomic reset can be triggered in a variety of ways. For example, an atomic reset may be performed periodically, after a fixed number of anchor insertions and removals have happened, after the memory consumption of the second tier reaches a threshold value, or other reset condition. For example, in some rare cases a Stern-Brocot tree can reach a state at which new elements cannot be inserted. If such a state is detected, then an atomic reset can be automatically triggered. Once an atomic reset is performed, the second tier of the path is deleted, freeing the previously consumed memory and the path is instead only represented via the first tier. The state after atomic reset is akin to document open. The reset needs to be performed atomically across clients without any intervening forest accesses or updates. In other words, all co-editing parties must collectively move to first tier, ensuring that all co-editing parties have a shared state following the atomic reset.

FIG. 7 shows an example of the forest data structure that is used for co-editing a sequential array (such as a Bezier path) with N elements (e.g., anchors) at the start (e.g., when the document is opened or following an atomic reset). At this stage, all co-editing parties have the same understanding (and thus the same local view) of array element indices. Thus, sequential array indices can themselves serve as global communication indices. Using this feature of sequential arrays, embodiments ensure that these initial indices remain stable and unaffected by any new insertions or deletions of elements.

In some embodiments, the initial global indices may not match the sequential array indices. For example, a mapping may exist between the global indices and the array indices:

$$G_i = (L_i + O)*C\ 0 \leq i \leq n, L_i = i$$

where, $G_i$ and $L_i$ respectively are the global index and local index of array element i. O is an offset, and C is a measure of the gap between any two initial successive global indices. Both O and C are constants. In the example shown in FIG. 7, both O and C are 1, though other values may be used depending on implementation.

As discussed, the range of real numbers between any two initial implicit indices is referred to as a segment. For N array elements, one can insert new elements before the first element (e.g., local sequential index 0) or after the last element (e.g., local sequential index n−1), or anywhere else in-between any two elements. Thus, at most n+1 segments are needed to represent insertions anywhere in the array. Since segment 0 and segment N are extremes and need to be available to allow for inserting a new first or last element, global indices 0 and n+1 are not assigned to any element of the array (e.g., Bezier path, etc.). All global indices always strictly lie inside the range (0, n+1). Any new insertions or deletions are handled inside these segments. An independent Stern-Brocot tree is created for every segment, when a first element is inserted, or deleted, in the segment.

As discussed, unless one of the co-editing parties execute an element insertion, element deletion or element reorder, the forest representation remains entirely logical, and no explicit Stern-Brocot tree is created. Note that element access does not affect local and global indices of array elements. So, if a sequential array is just being accessed without any of the said operations ever being executed, then there is no need to create a second tier of the forest, and the array can be fully represented using the logical first tier (thus, not consuming any system memory).

In the example of FIG. 7, new anchor points have been added in segment 0 (e.g., before the first anchor point of Bezier path 700) and at segment 5 (e.g., between anchor points with implicit indices 5 and 6). These changes can then be converted from the local indices to the corresponding global indices before being propagated to other co-editing parties. Additional details of element insertion, deletion, and reordering operations is provided below with respect to FIG. 8.

Figure 8:
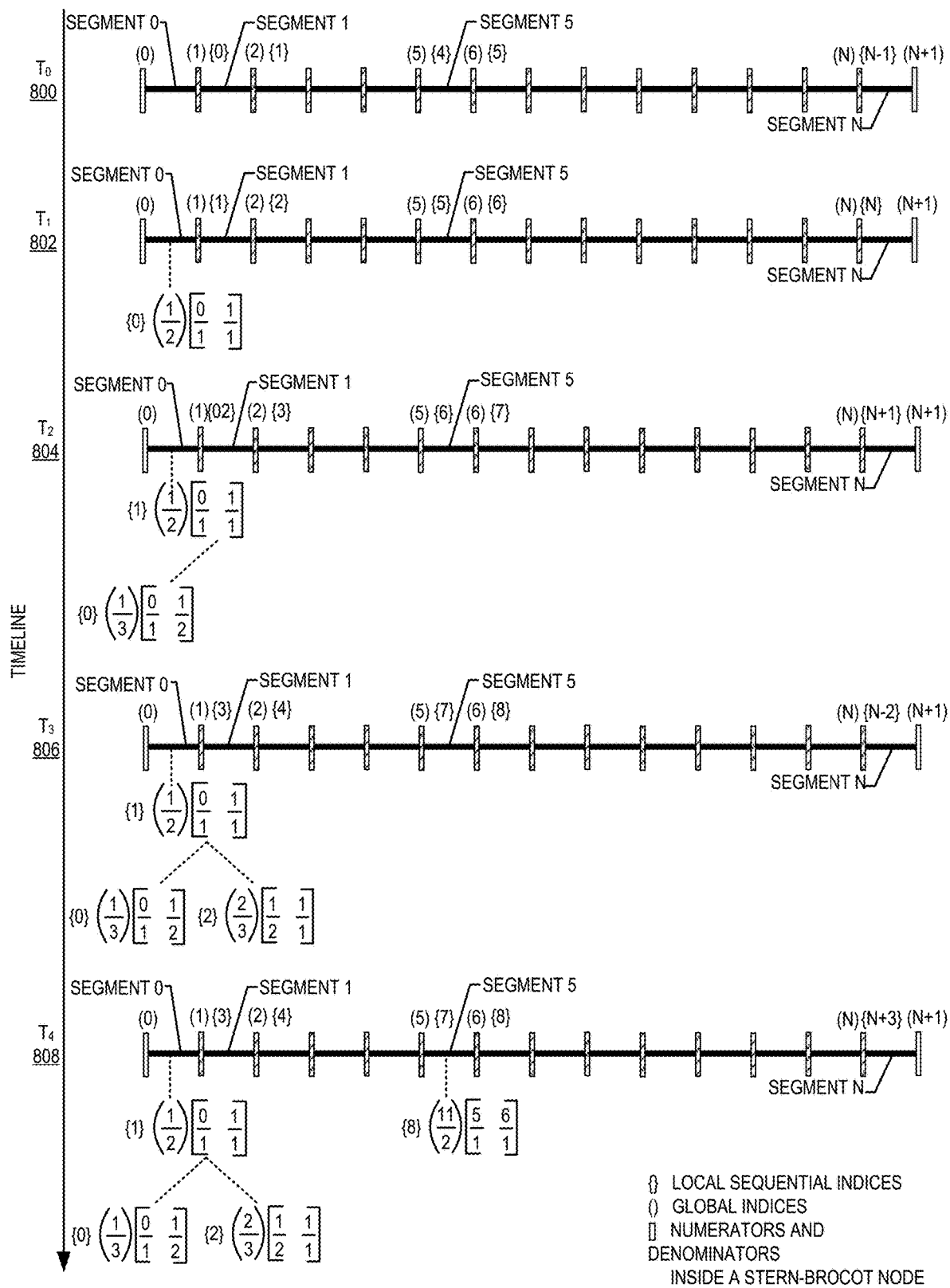
FIG. 8 illustrates an example of a Stern-Brocot forest, in accordance with one or more embodiments.

FIG. 8 illustrates an example of using a Stern-Brocot forest to manage changes to a co-edited document, in accordance with one or more embodiments. When a new element is inserted by one of the co-editing parties at local sequential index i, the co-editing management system needs to locate the segment associated with the insertion to determine whether a new Stern-Brocot tree is to be created or to determine where to place the new element in an existing Stern-Brocot tree associated with that segment. To identify the segment, the co-editing management system scans the forest left to right counting the number of implicit and explicit indices currently consumed in the forest and finds the segment which currently holds sequential index i. Alternatively, this information may be cached, to avoid having to scan the forest to identify the segment. In some embodiments, the implicit index just before a segment (also referred to as a segment hook) belongs to the segment, and the implicit index just after the segment is not a part of this segment (e.g., it belongs to the next segment). In other words, segment 1 includes implicit index 1, segment 2 includes implicit index 2, and segment N includes implicit index N. Implicit indices 0 and N+1 do not belong to any segment.

FIG. 8 shows four insertions starting from initial state of the forest (time $T_0$ 800). At the initial state, local sequential indices (depicted inside curly braces) of array elements vary from 0 to N−1, and their corresponding global indices (depicted inside parenthesis) vary from 1 to N. At this initial state, the forest only has the logical first tier, as no changes have yet been made to the Bezier path. At time $T_1$ 802, a first insertion happens at local sequential index 0. This means that the new element must now acquire local index 0 and the existing local indices must be displaced by one index each. The co-editing management system first locates segment 0, which is the segment to which current sequential index 0 belongs. Since this segment does not have any existing Stern-Brocot tree, a new one is created and a new node (e.g., the root of this tree) is added for the array element to be inserted. The global index for this new node is ½ or 0.5, and the application can use this to communicate the insertion to other co-editing parties. Note that the insertion of this element did not change global index of any other element in the forest. So, all previous communication (coming in from other co-editing parties) still remain valid and point to the correct array elements.

At time $T_2$ 804, another insertion is requested at index 0. The same procedure repeats, but this time the Stern-Brocot tree for the segment already exists and thus a new node is created in the tree. Since any Stern-Brocot tree is also a normal binary tree, the location of a new node in the tree is identified by going left (if the new element is being inserted before the existing element) or right (if the new element is being inserted after the existing element) of every parent node (starting with tree's root) until no further nodes are identified. Insertion, deletion, and access cost in a Stern-Brocot tree is O(log n), just like any other binary tree. In this case, the insertion is made before the existing node in the tree (as the new node becomes index 0), so the tree is traversed left from the root. Since there is no other node to the left of root, this is the correct location for insertion. The global index for the newly inserted element becomes ⅓. Again, note that the global indices of none of the existing nodes changed in this process.

At time T3 806, a third insertion belonging to segment 0 is requested, but this time the requested local sequential index of the insertion is 2. Thus, the existing tree is traversed right from the root of the corresponding Stern-Brocot node (which currently represents local sequential index 1) and a new node is inserted there as there is no existing right child node. This node assigns the global index ⅔ to the inserted element.

Finally, at time T4 808, an insertion happens at local sequential index 8. This belongs to segment 5, where no Stern-Brocot tree currently exists. Thus, one is created and global index 11⁄2 or 5.5 is assigned.

The four numbers in square brackets against every Stern-Brocot node are numerators and denominators of the left and right ancestors of the node. As discussed, every Stern-Brocot node is created from two ancestors (e.g., one that immediately lies to the left of the node on the number line, and the other that lies immediately to the right on the number line). Numerators of these two nodes can be added to get the numerator of the child, and denominators of these two ancestors can be added to obtain the denominator of the child. Dividing the child's numerator by its denominator yields its unique global index. The problem with this setup is that one needs to explicitly travel the tree (up the parent hierarchy) and find the nodes lying immediately to the left and right of the location where the new node is getting inserted. While this is not very expensive and an O(log n) traversal can manage this, there exists another way. For example, one can carry the numerators and denominators of ancestors down the tree and maintain them at every tree node. This way, when a new node needs to be created there is no need of locating ancestors as their numerators and denominators are already known. This requires maintaining four integral numbers (left numerator, left denominator, right numerator, and right denominator) at every Stern-Brocot node. For creating the root node of the Stern-Brocot tree in segment i, these numbers are assigned as follows:

Left Numerator=$G_{i+1}$
Left Denominator=1
Right Numerator=$G_i$
Right Denominator=1 where, $G_i$ and $G_{i+1}$ are the global indices. As more nodes are created down the tree, inserting a node to the left of a parent node inherits its right numerator and right denominator from the parent. The left numerator becomes the sum of left and right numerators of the parent, while the left denominator becomes the sum of the left and right denominators of the parent. For inserting a right child, its left numerator and left denominator are copied from the parent node, while its right numerator is the sum of both numerators of the parent and its right denominator is the sum of both denominators of the parent. In some embodiments, alternative conventions may be implemented. For example, without loss of generality, one can swap what is stored in left and right numerators and denominators.

Note that since every node now carries information of its ancestors, to find the global numerator of a node one needs to add the two ancestral numerators stored in it and the same for denominators. For example, the node inserted at time T1 800 has its numerator given by 1+0 (e.g., 1) and denominator given by 1+1 (e.g., 2). This makes the global index of this node ½, as shown in FIG. 8. Global indices may be stored as matrices or as floating-point values, depending on implementation.

As discussed, inserting a new node requires first locating the correct segment. This is achieved by a linear O(n) walk over the segments until the desired segment is reached and maintaining a sum of the count of implicit indices and the nodes inside Stern-Brocot trees encountered thus far. In some embodiments, this search can be optimized by maintaining a running count (or by using other search indexing techniques) up to every segment and doing a binary search or by maintaining hashes or other secondary data structures.

In addition to element insertion, elements may also be deleted. This can include both initial elements and newly added elements. Because the initial elements are not stored as part of the forest data structure, deletion of implicitly indexed elements is handled differently than explicitly indexed elements. Because elements represented by implicit indices have no storage component, there is nowhere to store an indicator (e.g., a flag) of that element's deletion. Accordingly, a different data structure can be created that maintains a list of deleted implicit indices. Alternatively, the indicator can be stored as part of its corresponding segment. In such an instance, each segment may be associated with a data structure such as the following:

```
Struct Segment contains
    bool isSegmentHookDeleted;
    std::set<SternBrocot.Node> sternBrocotTree;
end
```

No segment physically exists until an element is inserted into it or its segment hook is deleted. When the latter happens, the corresponding flag in the segment is set to true. In contrast, when an explicitly indexed element is deleted, the corresponding node is deleted from the corresponding Stern-Brocot tree. Alternatively, a flag can be set for tier two nodes similar to tier one nodes to indicate deletion. This consumes additional memory that could otherwise be freed but ensures that changes are not mistakenly applied to the wrong node due to improper indexing. In some embodiments, each node can maintain how many nodes to the left of that node have been deleted and how many nodes to the right of that node have been deleted. This can be used to correctly index subsequently created nodes. If a large number of nodes have been deleted, it may be more efficient to maintain counters as opposed to flags or other data. In some embodiments, a threshold may be used to determine which method of tracking deleted nodes is used.

In some embodiments, if an implicitly indexed element is re-inserted after deletion, the deleted segment hook is not restored. Instead, the new insertion is treated like any other normal insertion by adding a new Stern-Brocot node. This ensures that the new node gets an unconsumed global index and there is no conflict from any in-flight remote operation that still needs to be applied to the locally deleted implicit index.

In addition to element insertion and element deletion, element reorder may also lead to changes to the local indices. For example, if an element at a local sequential index i is moved to another local sequential index j, this may be treated as two separate operations inside the forest but externally it remains a single operation for co-editing. The two operations applied to the forest are deletion at index i, followed by an insertion at index j−1, if i is less than j, or an insertion at index j if i is greater than or equal to j. In either case, an element reorder operation leads to two updates: one for the insertion and one for the removal.

Figure 9:
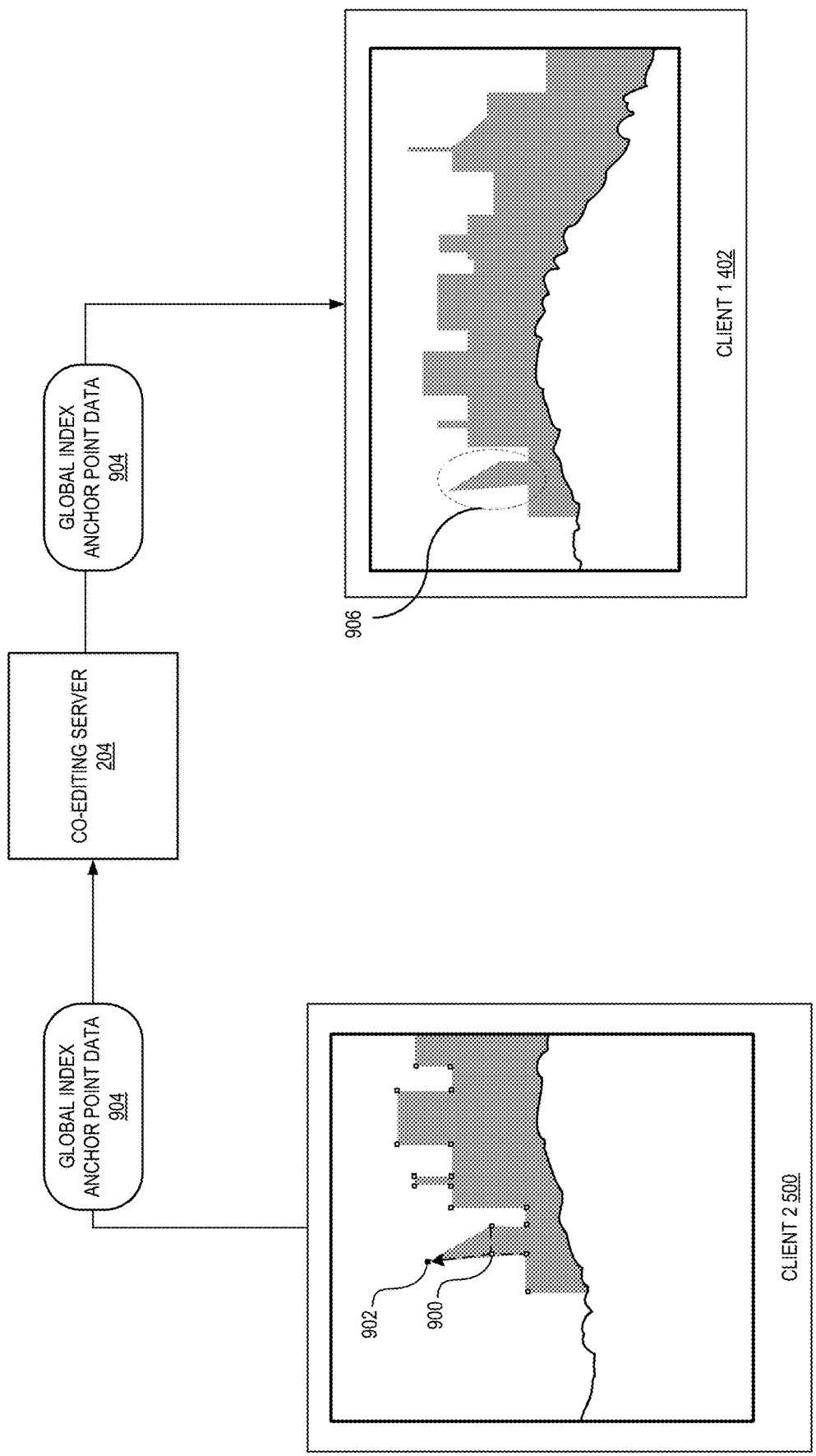
FIG. 9 illustrates an example of using a Stern-Brocot forest to manage changes to a co-edited document, in accordance with one or more embodiments.

FIG. 9 illustrates an example of changes made to a co-edited drawing in accordance with one or more embodiments. Using the techniques described above, when one co-editing party makes a change to a co-edited document, their client determines the global index for the element that has been modified and sends the global index and the element change information to co-editing server 204 to be shared with other co-editing parties. Using the example from FIGS. 4 and 5, one user, using client 2 500 changes the position of an anchor point of a Bezier path from a first position 900 to a second position 902. No elements have been added, deleted, or reordered, so a new element is not created. As such, the client can determine the global index for the changed anchor point and send that along with the new anchor point position data 904 to co-editing server 204. This is then provided by the co-editing server to other co-editing parties, such as client 1 402. Once received, client 1 translates the global index to its own local index and applies the change to the anchor point. As shown at 906, the correct anchor point has been updated, resulting in the drawings on both clients being synchronized (unlike the example of FIG. 5 in which the wrong anchor point was updated).

FIG. 10 illustrates an example of comparative performance of techniques for managing Bezier paths in a co-edited document. As discussed, embodiments require transferring significantly less data to keep co-edited documents synchronized. For example, one conventional technique is to update the full path data when a change to any anchor point of that path is changed. Table 1000 of FIG. 10 shows an estimate of the amount of data required per co-edit message to update Bezier path data as the number of anchor points in the Bezier path increases. As shown, sending data for all anchor points when any change to a path is made is very resource expensive. However, by allowing only the changed anchor point to be sent, the cost of transmitting the update is independent of the overall size of the Bezier path being modified.

Figure 11:
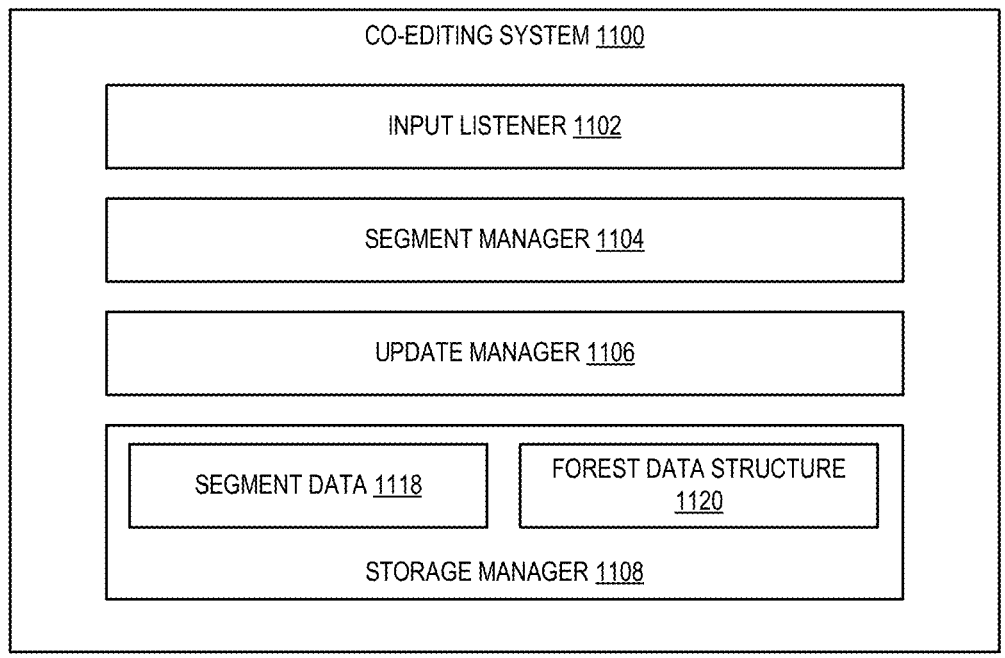
FIG. 11 illustrates a schematic diagram of a co-editing management system in accordance with one or more embodiments.

FIG. 11 illustrates a schematic diagram of co-editing management system (e.g., "co-editing management system" described above) in accordance with one or more embodiments. As shown, the co-editing management system 1100 may include, but is not limited to, an input listener 1102, a segment manager 1104, an update manager 1106, and a storage manager 1108. The storage manager 1108 includes segment data 1118 and forest data structure 1120.

As illustrated in FIG. 11, the co-editing management system 1100 includes an input listener 1102. As discussed, the co-editing management system 1100 may be implemented as part of a digital design system or other system or application which enables multiple users to simultaneously edit a document. Alternatively, the co-editing management system 1100 can be in communication with a digital design system or similar application to propagate changes made by one user to other co-editing parties. Regardless of implementation, the input listener 1102 monitors operations performed in the digital design system on the co-edited document. The input listener determines whether the operation is relevant for co-editing purposes. For example, the input may include changing a view of the co-edited document or other inputs that do not modify any objects, such as Bezier paths, of the co-edited document. Such inputs can be ignored. However, if the input results in a change to an object of the co-edited document, then the input listener 1102 passes details of the change to segment manager 1104.

As further illustrated in FIG. 11, the co-editing management system 1100 may further include a segment manager 1104. The segment manager 1104 can determine which element of the sequential array is associated with the change. For example, in a vector graphics application, the change may include adding, deleting, or reordering anchor points of a Bezier path. Each anchor point of the initial state of the Bezier path corresponds to an element. When the change includes adding an element, the segment manager 1104 is also responsible for determining whether the forest data structure 1120 includes a Stern-Brocot tree corresponding to the changed element. If no Stern-Brocot tree exists, the segment manager can create a new one. If a Stern-Brocot tree does exist, the segment manager can create a new node corresponding to the new element. When the change includes deleting an element, the segment data structure is responsible for determining whether the deleted element is implicitly or explicitly indexed and update accordingly. For example, the segment manager 1104 can update segment data 1118 with a flag indicating that an implicitly indexed element has been deleted. Additionally, the segment manager 1104 can delete the corresponding node from the forest data structure 1120 for explicitly indexed elements.

As further illustrated in FIG. 11, the co-editing management system 1100 may further include an update manager 1106. The update manager 1106 generates an update to be sent to all co-editing parties. The update includes a global index, received from the segment manager, of the node that corresponds to the change. As discussed, the update can be sent by the update manager to a co-editing server which then shares the update with other co-editing parties.

As illustrated in FIG. 11, the co-editing management system 1100 also includes the storage manager 1108. The storage manager 1108 maintains data for the co-editing management system 1100. The storage manager 1108 can maintain data of any type, size, or kind as necessary to perform the functions of the co-editing management system 1100. The storage manager 1108, as shown in FIG. 11, includes the segment data 1118. As discussed, any given segment of the forest data structure may include its own data that is used to store a flag that indicates whether any of the implicitly indexed elements have been deleted. The storage manager 1108 also include the forest data structure 1120. As discussed, the forest data structure may be a two-tiered data structure used to represent a sequential array, such as a Bezier path. The first tier may be a logical tier that is indexed implicitly based on the structure of the array. The second tier may be a physical tier which includes one or more Stern-Brocot trees that represent changes made to the array (e.g., added elements, reordered elements, deleted elements, etc.). Since the first tier is implicitly indexed, there are no startup delays due to explicitly indexing elements and it does not consume memory. The use of Stern-Brocot trees provides an efficient way to represent indices that can be readily converted from local indices to global indices to ensure changes are propagated accurately.

Each of the components 1102-1108 of the co-editing management system 1100 and their corresponding elements (as shown in FIG. 11) may be in communication with one another using any suitable communication technologies. It will be recognized that although components 1102-1108 and their corresponding elements are shown to be separate in FIG. 11, any of components 1102-1108 and their corresponding elements may be combined into fewer components, such as into a single facility or module, divided into more components, or configured into different components as may serve a particular embodiment.

The components 1102-1108 and their corresponding elements can comprise software, hardware, or both. For example, the components 1102-1108 and their corresponding elements can comprise one or more instructions stored on a computer-readable storage medium and executable by processors of one or more computing devices. When executed by the one or more processors, the computer-executable instructions of the co-editing management system 1100 can cause a client device and/or a server device to perform the methods described herein. Alternatively, the components 1102-1108 and their corresponding elements can comprise hardware, such as a special purpose processing device to perform a certain function or group of functions. Additionally, the components 1102-1108 and their corresponding elements can comprise a combination of computer-executable instructions and hardware.

Furthermore, the components 1102-1108 of the co-editing management system 1100 may, for example, be implemented as one or more stand-alone applications, as one or more modules of an application, as one or more plug-ins, as one or more library functions or functions that may be called by other applications, and/or as a cloud-computing model. Thus, the components 1102-1108 of the co-editing management system 1100 may be implemented as a stand-alone application, such as a desktop or mobile application. Furthermore, the components 1102-1108 of the co-editing management system 1100 may be implemented as one or more web-based applications hosted on a remote server. Alternatively, or additionally, the components of the co-editing management system 1100 may be implemented in a suit of mobile device applications or "apps."

Figure 12:
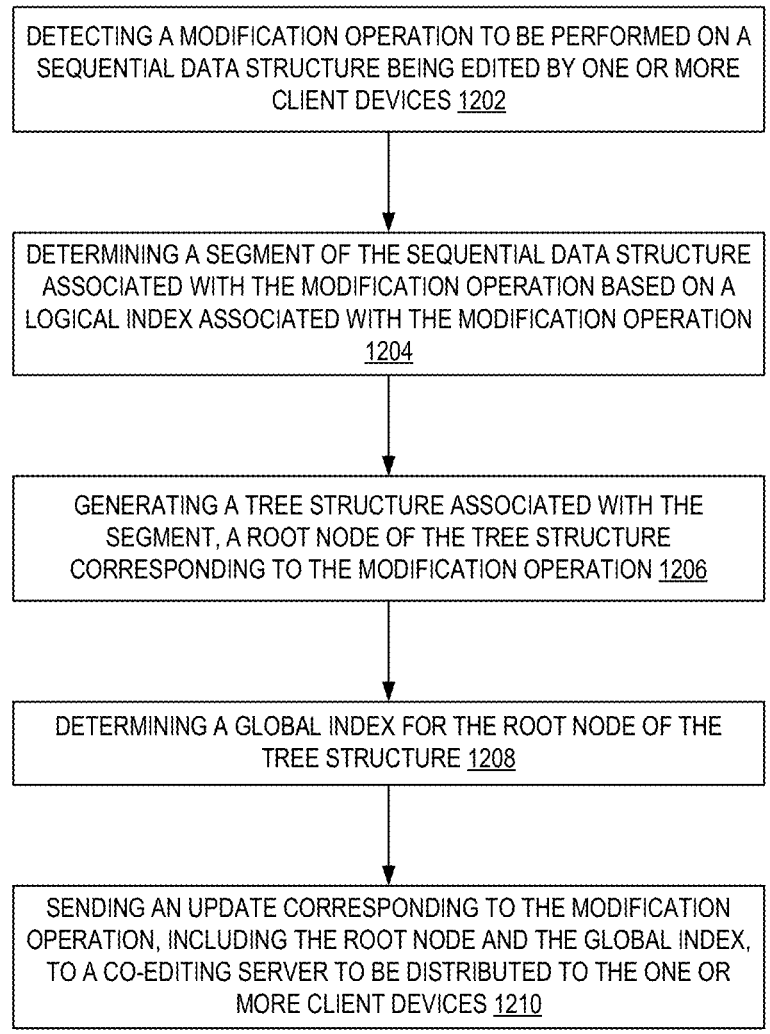
FIG. 12 illustrates a flowchart of a series of acts in a method of co-editing management in accordance with one or more embodiments.

FIGS. 1-11, the corresponding text, and the examples, provide a number of different systems and devices that implement co-editing management as described herein. In addition to the foregoing, embodiments can also be described in terms of flowcharts comprising acts and steps in a method for accomplishing a particular result. For example, FIG. 12 illustrates a flowchart of an exemplary method in accordance with one or more embodiments. The method described in relation to FIG. 12 may be performed with fewer or more steps/acts or the steps/acts may be performed in differing orders. Additionally, the steps/acts described herein may be repeated or performed in parallel with one another or in parallel with different instances of the same or similar steps/acts.

FIG. 12 illustrates a flowchart 1200 of a series of acts in a method of co-editing management in accordance with one or more embodiments. In one or more embodiments, the method 1200 is performed in a digital medium environment that includes the co-editing management system 1100. The method 1200 is intended to be illustrative of one or more methods in accordance with the present disclosure and is not intended to limit potential embodiments. Alternative embodiments can include additional, fewer, or different steps than those articulated in FIG. 12.

As illustrated in FIG. 12, the method 1200 includes an act 1202 of detecting a modification operation to be performed on a sequential data structure being edited by one or more client devices. For example, an input listener can listen for specific operations performed on the sequential data structure the cause a co-editing event. For example, in some embodiments, the sequential data structure represents a Bezier path and wherein each element of the sequential data structure corresponds to an anchor point of the Bezier path. In such instances, the modification operations may include one or more of adding an anchor point, deleting an anchor point, or reordering anchor points associated with the Bezier path.

As illustrated in FIG. 12, the method 1200 also includes an act 1204 of determining a segment of the sequential data structure associated with the modification operation based on a logical index associated with the modification operation. As discussed, the co-editing system can determine the segment associated with the modification operation by traversing nodes to the left and the right of where the modification operation was performed.

As illustrated in FIG. 12, the method 1200 also includes an act 1206 of generating a tree structure associated with the segment, a root node of the tree structure corresponding to the modification operation. For example, when a new element is added, and the segment does not already have a tree structure associated with it, a new tree structure is generated, and the root node of the new tree structure is associated with the new element. In some embodiments, generating the tree structure includes associating the root node of the tree structure with property data associated with the modification operation, wherein the modification operation is an element addition operation, and storing the tree structure in memory.

As illustrated in FIG. 12, the method 1200 also includes an act 1208 of determining a global index for the root node of the tree structure. In some embodiments, the tree structure is a Stern-Brocot tree. As discussed, the Stern-Brocot tree includes nodes that represent fractional indices. When a new Stern-Brocot tree is added to the forest data structure, it is indexed using the global indices of the initial elements of the data structure. The Stern-Brocot index therefore corresponds to a global index for the element and can be converted by co-editing parties to local indices to apply the change to their copies of the co-edited document.

As illustrated in FIG. 12, the method 1200 also includes an act 1210 of sending an update corresponding to the modification operation, including the root node and the global index, to a co-editing server to be distributed to the one or more client devices.

In some embodiments, the method further includes the acts of detecting a second modification operation, the second modification operation to delete an element from the sequential data structure, determining that the element is associated with an implicit index, identifying a segment associated with the implicit index, and updating a flag associated with the segment to indicate that the element is deleted.

In some embodiments, the method further includes the acts of detecting a second modification operation, the second modification operation to delete an element from the sequential data structure, determining that the element is associated with a node of the tree structure, and deleting the node from the tree structure.

In some embodiments, the method further includes the acts of detecting a second modification operation, the second modification operation to reorder an element of the sequential data structure from a first local index to a second local index, deleting the element from the sequential data structure, adding a new element to the sequential data structure using the second local index, determining global indices corresponding to the first local index and the second local index, and sending a second update, including the global indices and data associated with the element, to the co-editing server to be distributed to one or more client devices.

In some embodiments, the method further includes the acts of determining an index reset condition has been met, obtaining a lock on the sequential data structure, and resetting logical indices of the sequential data structure based on a current state of the sequential data structure. In some embodiments, the index reset condition includes one or more of a number of operations performed on the sequential data structure or a time-out period since a last operation was performed on the sequential data structure.

Figure 13:
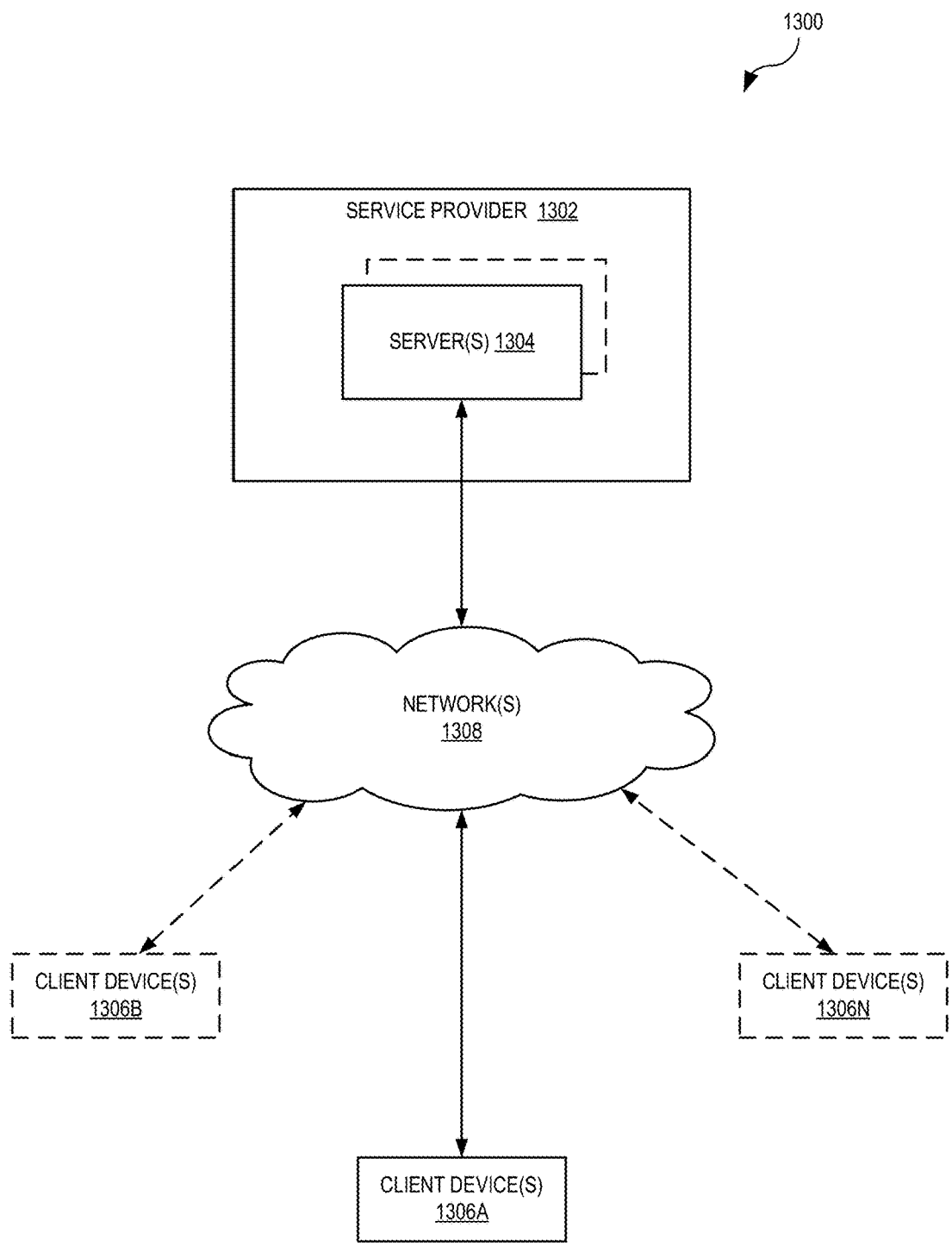
FIG. 13 illustrates a schematic diagram of an exemplary environment in which the co-editing management system can operate in accordance with one or more embodiments.

FIG. 13 illustrates a schematic diagram of an exemplary environment 1300 in which the co-editing management system 1100 can operate in accordance with one or more embodiments. In one or more embodiments, the environment 1300 includes a service provider 1302 which may include one or more servers 1304 connected to a plurality of client devices 1306A-1306N via one or more networks 1308. The client devices 1306A-1306N, the one or more networks 1308, the service provider 1302, and the one or more servers 1304 may communicate with each other or other components using any communication platforms and technologies suitable for transporting data and/or communication signals, including any known communication technologies, devices, media, and protocols supportive of remote data communications, examples of which will be described in more detail below with respect to FIG. 14.

Although FIG. 13 illustrates a particular arrangement of the client devices 1306A-1306N, the one or more networks 1308, the service provider 1302, and the one or more servers 1304, various additional arrangements are possible. For example, the client devices 1306A-1306N may directly communicate with the one or more servers 1304, bypassing the network 1308. Or alternatively, the client devices 1306A-1306N may directly communicate with each other. The service provider 1302 may be a public cloud service provider which owns and operates their own infrastructure in one or more data centers and provides this infrastructure to customers and end users on demand to host applications on the one or more servers 1304. The servers may include one or more hardware servers (e.g., hosts), each with its own computing resources (e.g., processors, memory, disk space, networking bandwidth, etc.) which may be securely divided between multiple customers, each of which may host their own applications on the one or more servers 1304. In some embodiments, the service provider may be a private cloud provider which maintains cloud infrastructure for a single organization. The one or more servers 1304 may similarly include one or more hardware servers, each with its own computing resources, which are divided among applications hosted by the one or more servers for use by members of the organization or their customers.

Similarly, although the environment 1300 of FIG. 13 is depicted as having various components, the environment 1300 may have additional or alternative components. For example, the environment 1300 can be implemented on a single computing device with the co-editing management system 1100. In particular, the co-editing management system 1100 may be implemented in whole or in part on the client device 1302A.

As illustrated in FIG. 13, the environment 1300 may include client devices 1306A-1306N. The client devices 1306A-1306N may comprise any computing device. For example, client devices 1306A-1306N may comprise one or more personal computers, laptop computers, mobile devices, mobile phones, tablets, special purpose computers, TVs, or other computing devices, including computing devices described below with regard to FIG. 14. Although three client devices are shown in FIG. 13, it will be appreciated that client devices 1306A-1306N may comprise any number of client devices (greater or smaller than shown).

Moreover, as illustrated in FIG. 13, the client devices 1306A-1306N and the one or more servers 1304 may communicate via one or more networks 1308. The one or more networks 1308 may represent a single network or a collection of networks (such as the Internet, a corporate intranet, a virtual private network (VPN), a local area network (LAN), a wireless local network (WLAN), a cellular network, a wide area network (WAN), a metropolitan area network (MAN), or a combination of two or more such networks. Thus, the one or more networks 1308 may be any suitable network over which the client devices 1306A-1306N may access service provider 1302 and server 1304, or vice versa. The one or more networks 1308 will be discussed in more detail below with regard to FIG. 14.

In addition, the environment 1300 may also include one or more servers 1304. The one or more servers 1304 may generate, store, receive, and transmit any type of data, including segment data 1118 and forest data structure 1120, or other information. For example, a server 1304 may receive data from a client device, such as the client device 1306A, and send the data to another client device, such as the client device 1302B and/or 1302N. The server 1304 can also transmit electronic messages between one or more users of the environment 1300. In one example embodiment, the server 1304 is a data server. The server 1304 can also comprise a communication server or a web-hosting server. Additional details regarding the server 1304 will be discussed below with respect to FIG. 14.

As mentioned, in one or more embodiments, the one or more servers 1304 can include or implement at least a portion of the co-editing management system 1100. In particular, the co-editing management system 1100 can comprise an application running on the one or more servers 1304 or a portion of the co-editing management system 1100 can be downloaded from the one or more servers 1304. For example, the co-editing management system 1100 can include a web hosting application that allows the client devices 1306A-1306N to interact with content hosted at the one or more servers 1304. To illustrate, in one or more embodiments of the environment 1300, one or more client devices 1306A-1306N can access a webpage supported by the one or more servers 1304. In particular, the client device 1306A can run a web application (e.g., a web browser) to allow a user to access, view, and/or interact with a webpage or website hosted at the one or more servers 1304.

As just described, the co-editing management system 1100 may be implemented in whole, or in part, by the individual elements 1302-1308 of the environment 1300. It will be appreciated that although certain components of the co-editing management system 1100 are described in the previous examples with regard to particular elements of the environment 1300, various alternative implementations are possible. For instance, in one or more embodiments, the co-editing management system 1100 is implemented on any of the client devices 1306A-N. Similarly, in one or more embodiments, the co-editing management system 1100 may be implemented on the one or more servers 1304. Moreover, different components and functions of the co-editing management system 1100 may be implemented separately among client devices 1306A-1306N, the one or more servers 1304, and the network 1308.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 14:
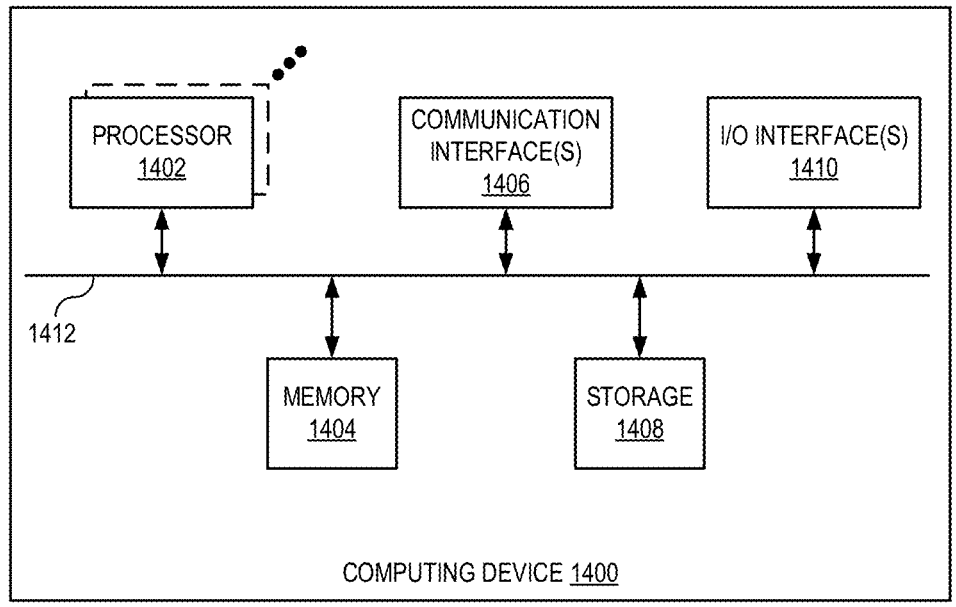
FIG. 14 illustrates a block diagram of an exemplary computing device in accordance with one or more embodiments.

FIG. 14 illustrates, in block diagram form, an exemplary computing device 1400 that may be configured to perform one or more of the processes described above. One will appreciate that one or more computing devices such as the computing device 1400 may implement the co-editing management system. As shown by FIG. 14, the computing device can comprise a processor 1402, memory 1404, one or more communication interfaces 1406, a storage device 1408, and one or more I/O devices/interfaces 1410. In certain embodiments, the computing device 1400 can include fewer or more components than those shown in FIG. 14. Components of computing device 1400 shown in FIG. 14 will now be described in additional detail.

In particular embodiments, processor(s) 1402 includes hardware for executing instructions, such as those making up a computer program. As an example, and not by way of limitation, to execute instructions, processor(s) 1402 may retrieve (or fetch) the instructions from an internal register, an internal cache, memory 1404, or a storage device 1408 and decode and execute them. In various embodiments, the processor(s) 1402 may include one or more central processing units (CPUs), graphics processing units (GPUs), field programmable gate arrays (FPGAs), systems on chip (SoC), or other processor(s) or combinations of processors.

The computing device 1400 includes memory 1404, which is coupled to the processor(s) 1402. The memory 1404 may be used for storing data, metadata, and programs for execution by the processor(s). The memory 1404 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 1404 may be internal or distributed memory.

The computing device 1400 can further include one or more communication interfaces 1406. A communication interface 1406 can include hardware, software, or both. The communication interface 1406 can provide one or more interfaces for communication (such as, for example, packet-based communication) between the computing device and one or more other computing devices 1400 or one or more networks. As an example and not by way of limitation, communication interface 1406 may include a network interface controller (NIC) or network adapter for communicating with an Ethernet or other wire-based network or a wireless NIC (WNIC) or wireless adapter for communicating with a wireless network, such as a WI-FI. The computing device 1400 can further include a bus 1412. The bus 1412 can comprise hardware, software, or both that couples components of computing device 1400 to each other.

The computing device 1400 includes a storage device 1408 includes storage for storing data or instructions. As an example, and not by way of limitation, storage device 1408 can comprise a non-transitory storage medium described above. The storage device 1408 may include a hard disk drive (HDD), flash memory, a Universal Serial Bus (USB) drive or a combination these or other storage devices. The computing device 1400 also includes one or more input or output ("I/O") devices/interfaces 1410, which are provided to allow a user to provide input to (such as user strokes), receive output from, and otherwise transfer data to and from the computing device 1400. These I/O devices/interfaces 1410 may include a mouse, keypad or a keyboard, a touch screen, camera, optical scanner, network interface, modem, other known I/O devices or a combination of such I/O devices/interfaces 1410. The touch screen may be activated with a stylus or a finger.

The I/O devices/interfaces 1410 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O devices/interfaces 1410 is configured to provide graphical data to a display for presentation to a user. The graphical data may be representative of one or more graphical user interfaces and/or any other graphical content as may serve a particular implementation.

In the foregoing specification, embodiments have been described with reference to specific exemplary embodiments thereof. Various embodiments are described with reference to details discussed herein, and the accompanying drawings illustrate the various embodiments. The description above and drawings are illustrative of one or more embodiments and are not to be construed as limiting. Numerous specific details are described to provide a thorough understanding of various embodiments.

Embodiments may include other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

In the various embodiments described above, unless specifically noted otherwise, disjunctive language such as the phrase "at least one of A, B, or C," is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

We claim:

1. A method comprising:
   detecting a modification operation to be performed on a sequential data structure being edited by one or more client devices;
   determining a segment of the sequential data structure associated with the modification operation based on a logical index associated with the modification operation;
   generating a tree structure associated with the segment, a root node of the tree structure corresponding to the modification operation;
   determining a global index for the root node of the tree structure; and
   sending an update corresponding to the modification operation, including the root node and the global index, to a co-editing server to be distributed to the one or more client devices.

2. The method of claim 1, wherein generating a tree structure associated with the segment, a root node of the tree structure corresponding to the modification operation further comprises:
   associating the root node of the tree structure with property data associated with the modification operation, wherein the modification operation is an element addition operation; and
   storing the tree structure in memory.

3. The method of claim 1, further comprising:
   detecting a second modification operation, the second modification operation to delete an element from the sequential data structure;
   determining that the element is associated with an implicit index;
   identifying a segment associated with the implicit index; and updating a flag associated with the segment to indicate that the element is deleted.

4. The method of claim 1, further comprising:
detecting a second modification operation, the second modification operation to delete an element from the sequential data structure;
determining that the element is associated with a node of the tree structure; and
deleting the node from the tree structure.

5. The method of claim 1, further comprising:
detecting a second modification operation, the second modification operation to reorder an element of the sequential data structure from a first local index to a second local index;
deleting the element from the sequential data structure;
adding a new element to the sequential data structure using the second local index;
determining global indices corresponding to the first local index and the second local index; and
sending a second update, including the global indices and data associated with the element, to the co-editing server to be distributed to one or more client devices.

6. The method of claim 1, wherein the sequential data structure represents a Bezier path and wherein each element of the sequential data structure corresponds to an anchor point of the Bezier path.

7. The method of claim 6, wherein the modification operation includes one or more of adding an anchor point, deleting an anchor point, or reordering anchor points associated with the Bezier path.

8. The method of claim 1, further comprising:
determining an index reset condition has been met;
obtaining a lock on the sequential data structure; and
resetting logical indices of the sequential data structure based on a current state of the sequential data structure.

9. The method of claim 8, wherein the index reset condition includes one or more of a number of operations performed on the sequential data structure or a time-out period since a last operation was performed on the sequential data structure.

10. The method of claim 1, wherein the tree structure is a Stern-Brocot tree.

11. A non-transitory computer-readable medium storing executable instructions, which when executed by a processing device, cause the processing device to perform operations comprising:
detecting a modification operation to be performed on a sequential data structure being edited by one or more client devices;
determining a segment of the sequential data structure associated with the modification operation based on a logical index associated with the modification operation;
generating a tree structure associated with the segment, a root node of the tree structure corresponding to the modification operation;
determining a global index for the root node of the tree structure; and
sending an update corresponding to the modification operation, including the root node and the global index, to a co-editing server to be distributed to the one or more client devices.

12. The non-transitory computer-readable medium of claim 11, wherein the operation of generating a tree structure associated with the segment, a root node of the tree structure corresponding to the modification operation further comprises:

associating the root node of the tree structure with property data associated with the modification operation, wherein the modification operation is an element addition operation; and
storing the tree structure in memory.

13. The non-transitory computer-readable medium of claim 11, wherein the operations further comprise:
detecting a second modification operation, the second modification operation to delete an element from the sequential data structure;
determining that the element is associated with an implicit index;
identifying a segment associated with the implicit index; and
updating a flag associated with the segment to indicate that the element is deleted.

14. The non-transitory computer-readable medium of claim 11, wherein the operations further comprise:
detecting a second modification operation, the second modification operation to delete an element from the sequential data structure;
determining that the element is associated with a node of the tree structure; and
deleting the node from the tree structure.

15. The non-transitory computer-readable medium of claim 11, wherein the operations further comprise:
detecting a second modification operation, the second modification operation to reorder an element of the sequential data structure from a first local index to a second local index;
deleting the element from the sequential data structure;
adding a new element to the sequential data structure using the second local index;
determining global indices corresponding to the first local index and the second local index; and
sending a second update, including the global indices and data associated with the element, to the co-editing server to be distributed to one or more client devices.

16. The non-transitory computer-readable medium of claim 11, wherein the sequential data structure represents a Bezier path and wherein each element of the sequential data structure corresponds to an anchor point of the Bezier path.

17. The non-transitory computer-readable medium of claim 16, wherein the modification operation includes one or more of adding an anchor point, deleting an anchor point, or reordering anchor points associated with the Bezier path.

18. The non-transitory computer-readable medium of claim 11, wherein the operations further comprise:
determining an index reset condition has been met;
obtaining a lock on the sequential data structure; and
resetting logical indices of the sequential data structure based on a current state of the sequential data structure.

19. The non-transitory computer-readable medium of claim 11, wherein the tree structure is a Stern-Brocot tree.

20. A system comprising:
memory storing instructions; and
processor coupled to the memory, the processor executing the instructions to perform operations comprising:
receiving a request to modify an anchor point associated with a Bezier path being edited by one or more client devices;
determining a segment associated with the request based on a logical index associated with a location on the Bezier path corresponding to the anchor point;

generating a tree structure associated with the segment, a root node of the tree structure including one or more properties of the anchor point modified based on the request;
determining a global index for the root node of the tree structure; and
causing the one or more properties of the anchor point to be replicated to the one or more client devices using the global index.

* * * * *